(12) United States Patent
Vassilovski et al.

(10) Patent No.: US 12,207,227 B2
(45) Date of Patent: *Jan. 21, 2025

(54) USER EQUIPMENT ANCHOR CAPABILITY INDICATION FOR SIDELINK-BASED POSITIONING

(71) Applicant: QUALCOMM Incorporated, San Diego, CA (US)

(72) Inventors: Dan Vassilovski, Del Mar, CA (US); Kapil Gulati, Belle Mead, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,411

(22) Filed: Nov. 17, 2023

(65) Prior Publication Data
US 2024/0089912 A1 Mar. 14, 2024

Related U.S. Application Data

(63) Continuation of application No. 17/341,238, filed on Jun. 7, 2021, now Pat. No. 11,849,424.

(51) Int. Cl.
*H04W 24/10* (2009.01)
*H04W 8/24* (2009.01)
(Continued)

(52) U.S. Cl.
CPC ........... *H04W 64/006* (2013.01); *H04W 8/24* (2013.01); *H04W 24/10* (2013.01); *H04W 92/18* (2013.01)

(58) Field of Classification Search
CPC ..... H04W 64/006; H04W 8/24; H04W 24/10; H04W 92/18; H04W 76/14; H04W 64/00; H04W 4/40
See application file for complete search history.

(56) References Cited

U.S. PATENT DOCUMENTS

2022/0236365 A1 7/2022 Ko et al.
2022/0271995 A1 8/2022 Dai et al.
(Continued)

FOREIGN PATENT DOCUMENTS

CN 103546888 A 1/2014
WO 2020246842 A1 12/2020

OTHER PUBLICATIONS

Cingular Wireless., et al., "Inclusion of Uplink TDOA UE positioning method in 3GPP TS 25.305", 3GPP TSG- RAN WG3 Meeting #44, R3-041283, 3rd Generation Partnership Project (3GPP), Mobile Competence Centre, 650, Route Des Lucioles, F-06921 Sophia-Antipolis Cedex, France, vol. RAN WG3, No. Sophia Antipolis, France, Oct. 1, 2004, 13 Pages, XP050157040.

(Continued)

*Primary Examiner* — Chuong A Ngo
(74) *Attorney, Agent, or Firm* — QUALCOMM Incorporated

(57) ABSTRACT

Disclosed are techniques for wireless communication. In an aspect, a first user equipment (UE) receives, from a network entity, a capability enquiry message for a sidelink positioning procedure, the capability enquiry message including at least a request for an indication of whether the first UE has the capability to provide a location of the first UE for the sidelink positioning procedure, and transmits, to the network node, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

24 Claims, 21 Drawing Sheets

(51) Int. Cl.
*H04W 64/00* (2009.01)
*H04W 92/18* (2009.01)

(56) References Cited

U.S. PATENT DOCUMENTS

2022/0394659 A1    12/2022  Vassilovski et al.
2023/0076030 A1*    3/2023  Baek .................... H04W 24/10

OTHER PUBLICATIONS

International Search Report and Written Opinion—PCT/US2022/072244—ISA/EPO—Sep. 1, 2022.
Piccolo F.L., et al., "A New Cooperative Localization Method for UMTS Cellular Networks", 2008 IEEE Global Telecommunications Conference: [IEEE Globecom 2008], New Orleans, Louisiana, Nov. 30, 2008-Dec. 4, 2008, IEEE, Piscataway, NJ, USA, Nov. 30, 2008, pp. 1-5, XP031370141, ISBN: 978-1-4244-2324-8.

* cited by examiner

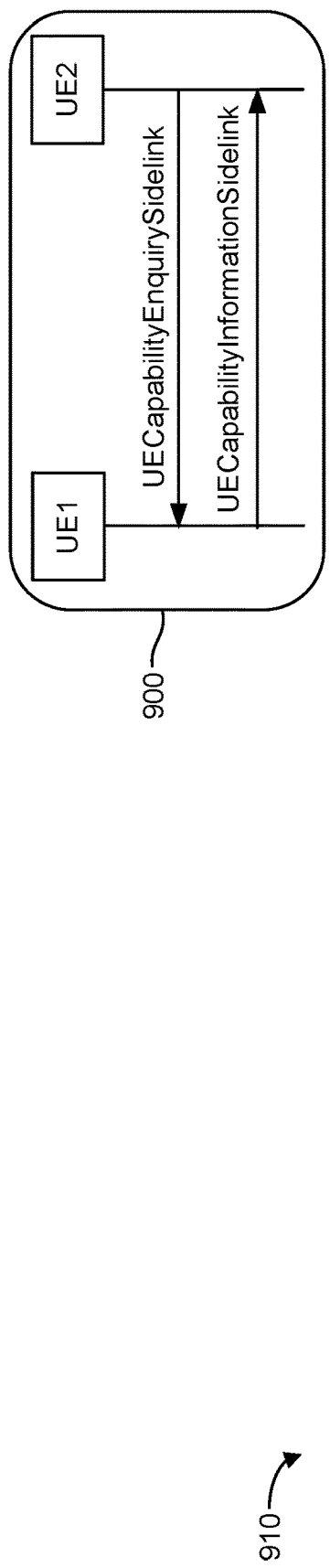

```
UECapabilityEnquirySidelink ::=          SEQUENCE {
    rrc-TransactionIdentifier-r16        RRC-TransactionIdentifier,
    criticalExtensions                   CHOICE {
        ueCapabilityEnquirySidelink-r16      UECapabilityEnquirySidelink-IEs-r16,
        criticalExtensionsFuture             SEQUENCE {}
    }
}

UECapabilityEnquirySidelink-IEs-r16 ::= SEQUENCE {
    frequencyBandListFilterSidelink-r16       FreqBandList                          OPTIONAL,
    ue-CapabilityInformationSidelink-r16      OCTET STRING                          OPTIONAL,
    lateNonCriticalExtension                  OCTET STRING                          OPTIONAL,
    sl-PositionAnchorCapabilityStatus         sl-PositionAnchorCapability           OPTIONAL,
    nonCriticalExtension                      SEQUENCE{}                            OPTIONAL
}
```

FIG. 9A

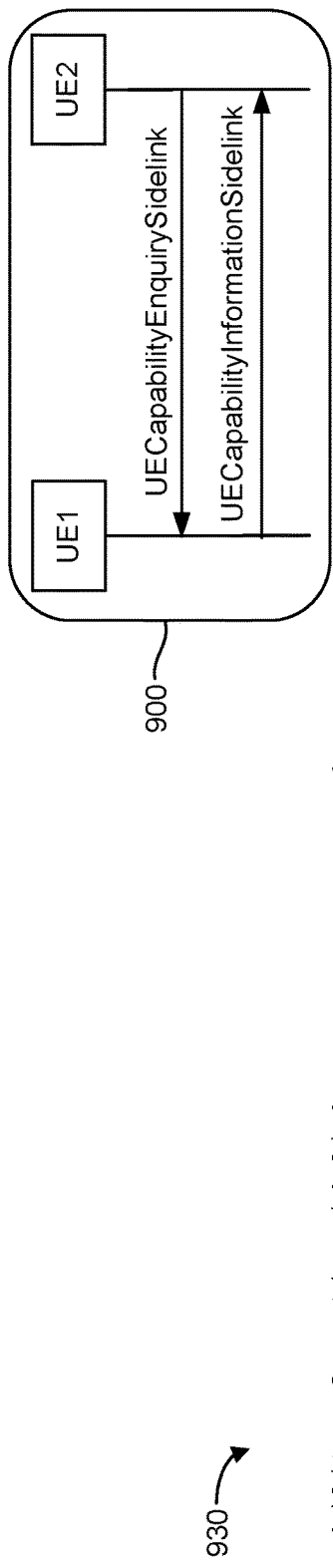

```
UECapabilityInformationSidelink ::=         SEQUENCE {
    rrc-TransactionIdentifier-r16           RRC-TransactionIdentifier,
    criticalExtensions                      CHOICE {
        ueCapabilityInformationSidelink-r16     UECapabilityInformationSidelink-IEs-r16,
        criticalExtensionsFuture                SEQUENCE {}
    }
}

UECapabilityInformationSidelink-IEs-r16 ::= SEQUENCE {
    accessStratumReleaseSidelink-r16            AccessStratumReleaseSidelink-r16,
    pdcp-ParametersSidelink-r16                 PDCP-ParametersSidelink-r16                             OPTIONAL,
    rlc-ParametersSidelink-r16                  RLC-ParametersSidelink-r16                              OPTIONAL,
    supportedBandCombinationListSidelinkNR-r16  BandCombinationListSidelinkNR-r16                       OPTIONAL,
    supportedBandListSidelink-r16               SEQUENCE (SIZE (1..maxBands)) OF BandSidelinkPC5-r16    OPTIONAL,
    appliedFreqBandListFilter-r16               FreqBandList                                            OPTIONAL,
    lateNonCriticalExtension                    OCTET STRING                                            OPTIONAL,
    [ sl-PositionAnchorCapability               sl-PositionAnchorCapability                             OPTIONAL, ]
    nonCriticalExtension                        SEQUENCE {}                                             OPTIONAL
}
```

FIG. 9B

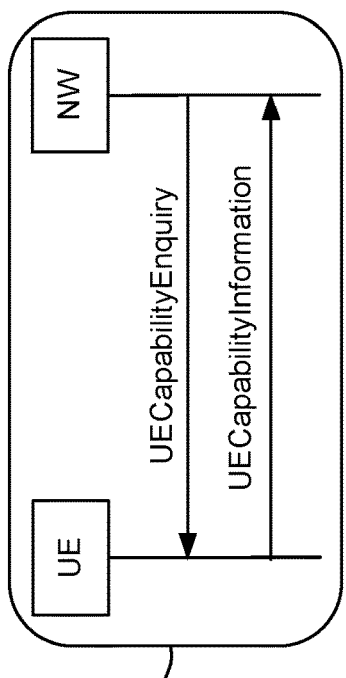

```
UECapabilityEnquirySidelink ::=         SEQUENCE {
    rrc-TransactionIdentifier   RRC-TransactionIdentifier,
    criticalExtensions          CHOICE {
        ueCapabilityEnquiry         UECapabilityEnquiry,
        criticalExtensionsFuture    SEQUENCE {}
    }
}

UECapabilityEnquiry-IEs ::=         SEQUENCE {
    ue-CapabilityRAT-RequestList        UE-CapabilityRAT-RequestList,
    lateNonCriticalExtension            OCTET STRING                                            OPTIONAL,
    ue-CapabilityEnquiryExt             OCTET STRING  (CONTAINING UECapabilityEnquiry-v1560-IEs)
                                                                                                OPTIONAL
}

UECapabilityEnquiry-v1560-IEs ::=   SEQUENCE {
    capabilityRequestFilterCommon       UE-CapabilityRequestFilterCommon                        OPTIONAL,
    nonCriticalExtension                UECapabilityEnquiry-v1610-IEs                           OPTIONAL
}

UECapabilityEnquiry-v1610-IEs ::=   SEQUENCE {
    rrc-SegAllowed-r16                  ENUMERATED {enabled}                                    OPTIONAL,
    nonCriticalExtension                SEQUENCE {}                            1012             OPTIONAL
[---------------------------------------------------------------------------]
[   sl-PositionAnchorCapabilityStatus     sl-PositionAnchorCapability        ]
[---------------------------------------------------------------------------]
}
```

FIG. 10A

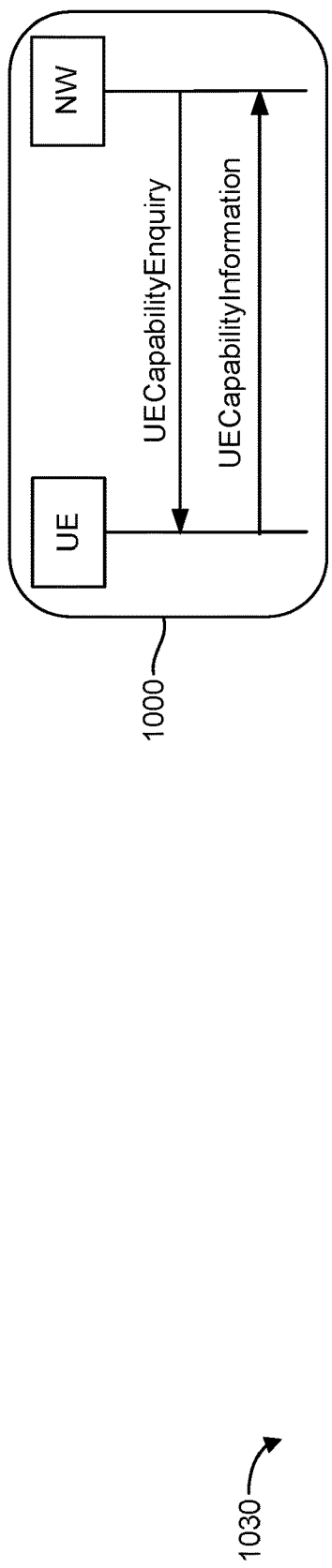

```
UECapabilityInformation ::=           SEQUENCE {
    rrc-TransactionIdentifier RRC-TransactionIdentifier,
    criticalExtensions        CHOICE {
        ueCapabilityInformation           UECapabilityInformation-IEs,
        criticalExtensionsFuture          SEQUENCE { }
    }
}

UECapabilityInformation-IEs ::=       SEQUENCE {
    ue-CapabilityRAT-ContainerList    UE-CapabilityRAT-ContainerList
    sl-PositionAnchorCapabilityStatus sl-PositionAnchorCapability       OPTIONAL,
                                                                        OPTIONAL,
    lateNonCriticalExtension          OCTET STRING                      OPTIONAL,
    nonCriticalExtension              SEQUENCE{ }                       OPTIONAL
}
```

USER EQUIPMENT ANCHOR CAPABILITY INDICATION FOR SIDELINK-BASED POSITIONING

CROSS-REFERENCE TO RELATED APPLICATIONS

The present Application for Patent is a continuation of U.S. patent application Ser. No. 17/341,238, entitled "USER EQUIPMENT ANCHOR CAPABILITY INDICATION FOR SIDELINK-BASED POSITIONING," filed Jun. 7, 2021, assigned to the assignee hereof, and expressly incorporated herein by reference in its entirety.

INTRODUCTION

Aspects of the disclosure relate generally to wireless communications, and more specifically, to sidelink-based positioning.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a first user equipment (UE) includes receiving, from a network node, a capability enquiry message for a sidelink positioning procedure, the capability enquiry message including at least a request for an indication of whether the first UE has the capability to provide a location of the first UE for the sidelink positioning procedure; and transmitting, to the network node, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

In an aspect, a method of wireless communication performed by a network node includes transmitting, to a first user equipment (UE), a capability enquiry message for a sidelink positioning procedure, the capability enquiry message including at least a request for an indication of whether the first UE has the capability to provide a location of the first UE for the sidelink positioning procedure; and receiving, from the first UE, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

In an aspect, a first user equipment (UE) includes a memory; and at least one processor communicatively coupled to the memory, the memory and the at least one processor configured to: receive, from a network node, a capability enquiry message for a sidelink positioning procedure, the capability enquiry message including at least a request for an indication of whether the first UE has the capability to provide a location of the first UE for the sidelink positioning procedure; and transmit, to the network node, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

In an aspect, a network node includes a memory; and at least one processor communicatively coupled to the memory, the memory and the at least one processor configured to: transmit, to a first user equipment (UE), a capability enquiry message for a sidelink positioning procedure, the capability enquiry message including at least a request for an indication of whether the first UE has the capability to provide a location of the first UE for the sidelink positioning procedure; and receive, from the first UE, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

In an aspect, a first user equipment (UE) includes means for receiving, from a network node, a capability enquiry message for a sidelink positioning procedure, the capability enquiry message including at least a request for an indication of whether the first UE has the capability to provide a location of the first UE for the sidelink positioning procedure; and means for transmitting, to the network node, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

In an aspect, a network node includes means for transmitting, to a first user equipment (UE), a capability enquiry message for a sidelink positioning procedure, the capability enquiry message including at least a request for an indication of whether the first UE has the capability to provide a location of the first UE for the sidelink positioning procedure; and means for receiving, from the first UE, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

In an aspect, a non-transitory computer-readable medium storing computer-executable instructions includes at least one instruction instructing a first user equipment (UE) to receive, from a network node, a capability enquiry message for a sidelink positioning procedure, the capability enquiry message including at least a request for an indication of whether the first UE has the capability to provide a location of the first UE for the sidelink positioning procedure; and at least one instruction instructing the first UE to transmit, to the network node, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

In an aspect, a non-transitory computer-readable medium storing computer-executable instructions includes at least one instruction instructing a network node to transmit, to a first user equipment (UE), a capability enquiry message for a sidelink positioning procedure, the capability enquiry message including at least a request for an indication of whether the first UE has the capability to provide a location of the first UE for the sidelink positioning procedure; and at least one instruction instructing the network node to receive, from the first UE, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 9A and 9B illustrate example information elements that may be exchanged between two UEs to request and provide a UE's anchor capability status, according to aspects of the disclosure.

FIGS. 10A and 10B illustrate example information elements that may be exchanged between a UE and a network entity to request and provide the UE's anchor capability status, according to aspects of the disclosure.

DETAILED DESCRIPTION

Figure 1:
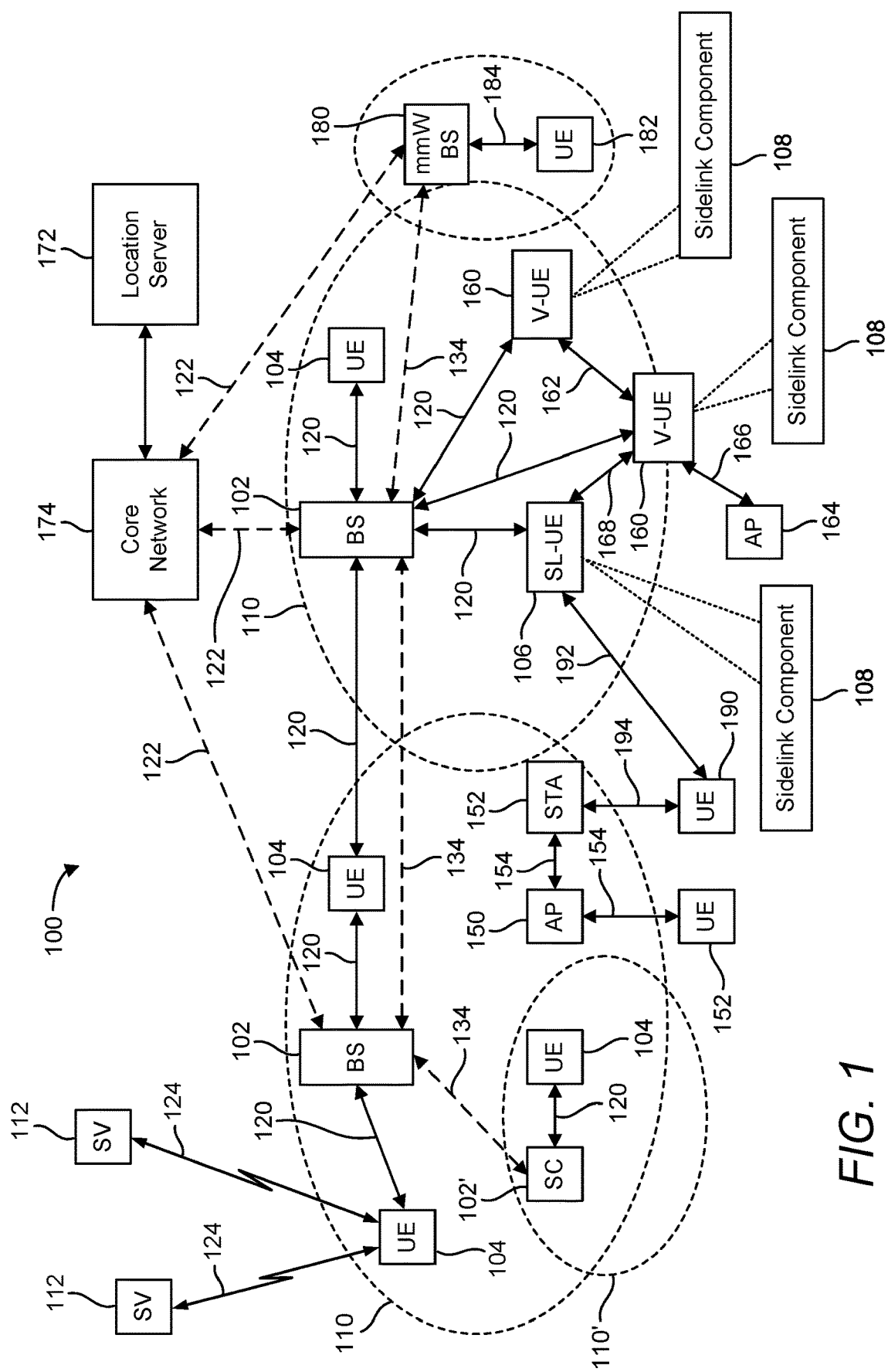
FIG. 1 illustrates an example wireless communications system, according to aspects of the disclosure.

For a user equipment (UE) to determine its location based on wireless signals exchanged with one or more other UEs during a sidelink positioning procedure (a positioning procedure to position one or more UEs based on wireless signals exchanged between multiple UEs, including the UE(s) to be positioned), at least one of the other UEs should be able to provide its location (to serve as an "anchor" for the location determination) to the UE. Similarly, for a network entity managing a sidelink positioning procedure between multiple UEs, a prerequisite for determining which UEs should participate in the sidelink positioning procedure is knowing which, if any, of the UEs can serve as anchors. As such, having a mechanism for a UE to inform the network and/or other UEs whether it can serve as an anchor for a sidelink positioning procedure would enable more successful positioning, insofar as positioning procedures would not be attempted with UEs that indicate they do not have the capability to serve as an anchor. The present disclosure provides a signaling mechanism for a UE to inform the network (and/or other UEs) of its capability to serve as an anchor for a sidelink positioning procedure. The information conveyed may include parameters indicating the UE's capability to serve as an anchor, its location, location accuracy, and its capability to perform sidelink positioning calculations based on receipt of measurements of wireless signals from other UEs. In one or more examples, the information elements used to configure these parameters may be incorporated into existing messages or as part of a new message specific to sidelink positioning.

The disclosed mechanisms enable a UE to provide, and a network node (a base station, location server, or another UE) to receive, the UE's capability to serve as an anchor for a sidelink positioning procedure. The disclosed mechanism thereby enables more successful positioning, insofar as positioning procedures would not be attempted with UEs that indicate they are not capable of serving as an anchor, thereby reducing unnecessary signaling.

Additional aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). A sidelink UE (SL-UE) is any type of UE capable of sidelink communication, and may be a V-UE, a P-UE, or another type of UE (e.g., an IoT device). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (e.g., a location management function (LMF) or a secure user plane location (SUPL) location platform (SLP)). The location server(s) 172 may be part of core network 174 or may be external to core network 174. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 (also referred to as a "roadside unit") over a wireless sidelink 166, or with SL-UEs 106 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160) and one of the UEs as an SL-UE (SL-UE 106), any of the other illustrated UEs (e.g., UEs 104, 152, 182, 190) may be V-UEs or SL-UEs. In addition, while only the V-UEs 160 and a single SL-UE 106 have been illustrated as being connected over a sidelink, any of the UEs illustrated in FIG. 1, whether V-UEs, P-UEs, etc., may be capable of sidelink communication, and may therefore be examples of SL-UEs. Further, although only UE 182 was described as being capable of beamforming, any of the illustrated UEs, including V-UEs 160 and SL-UE 106, may be capable of beamforming. Where V-UEs 160 and SL-UE 106 are capable of beamforming, they may beamform towards each other (i.e., towards other V-UEs 160 and SL-UEs 106), towards roadside access points 164, towards other UEs (e.g., UEs 104, 106, 152, 182, 190), etc. Thus, in some cases, V-UEs 160 and SL-UEs 106 may utilize beamforming over sidelinks 162, 166, and 168.

In an aspect, the V-UEs 160 and the SL-UE 106 include a sidelink component 108 that may enable the V-UEs 160 and the SL-UE 106 to perform the sidelink communication operations described herein. Note that although only V-UEs 160 and SL-UE 106 are illustrated as including a sidelink component 108, any of the UEs (and base stations supporting sidelink communication) in FIG. 1 may include a sidelink component 108.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with the SL-UE 106 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity).

In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
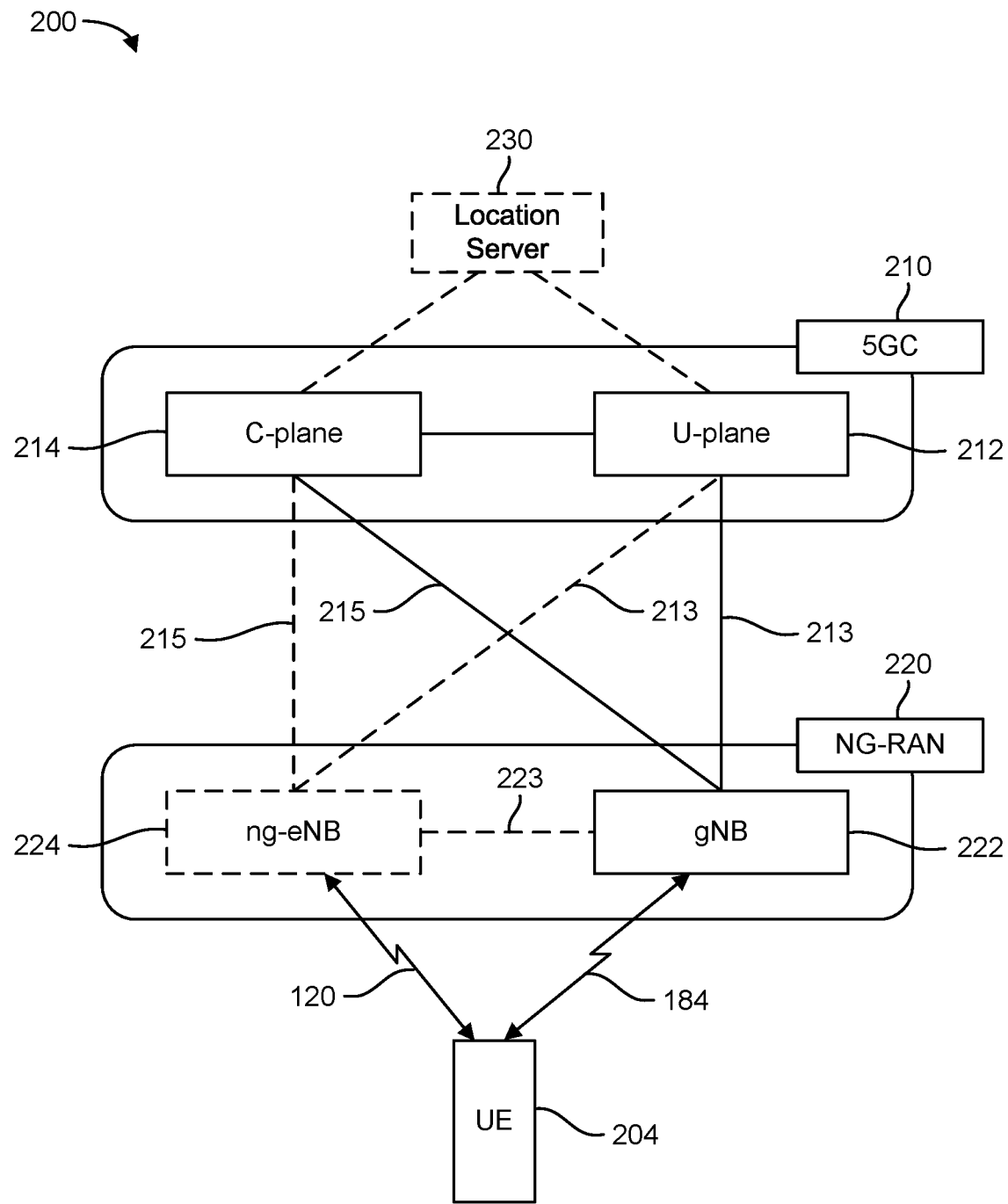
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNB s 222, while other configurations include one or more of both ng-eNBs 224 and gNB s 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
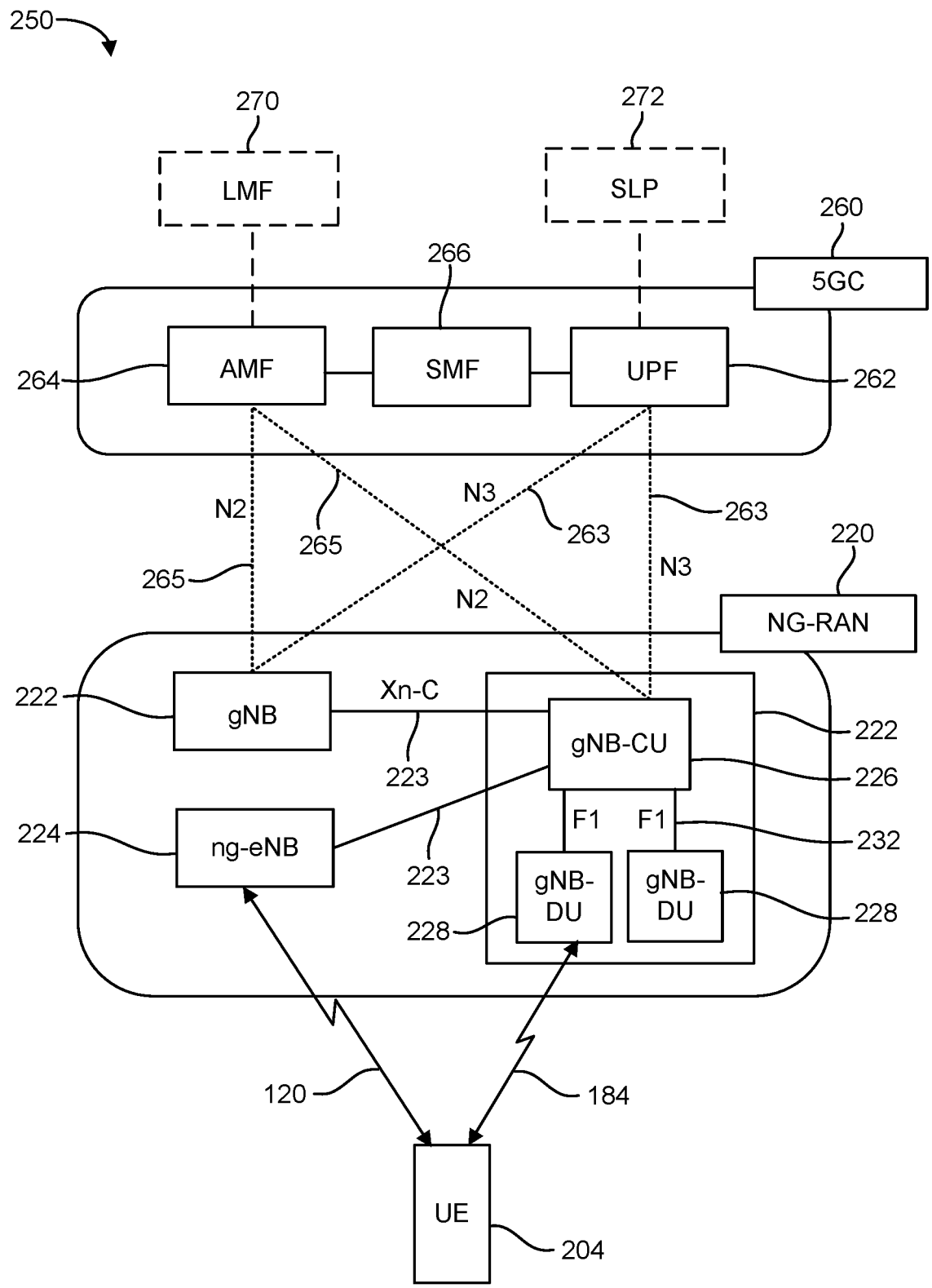

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
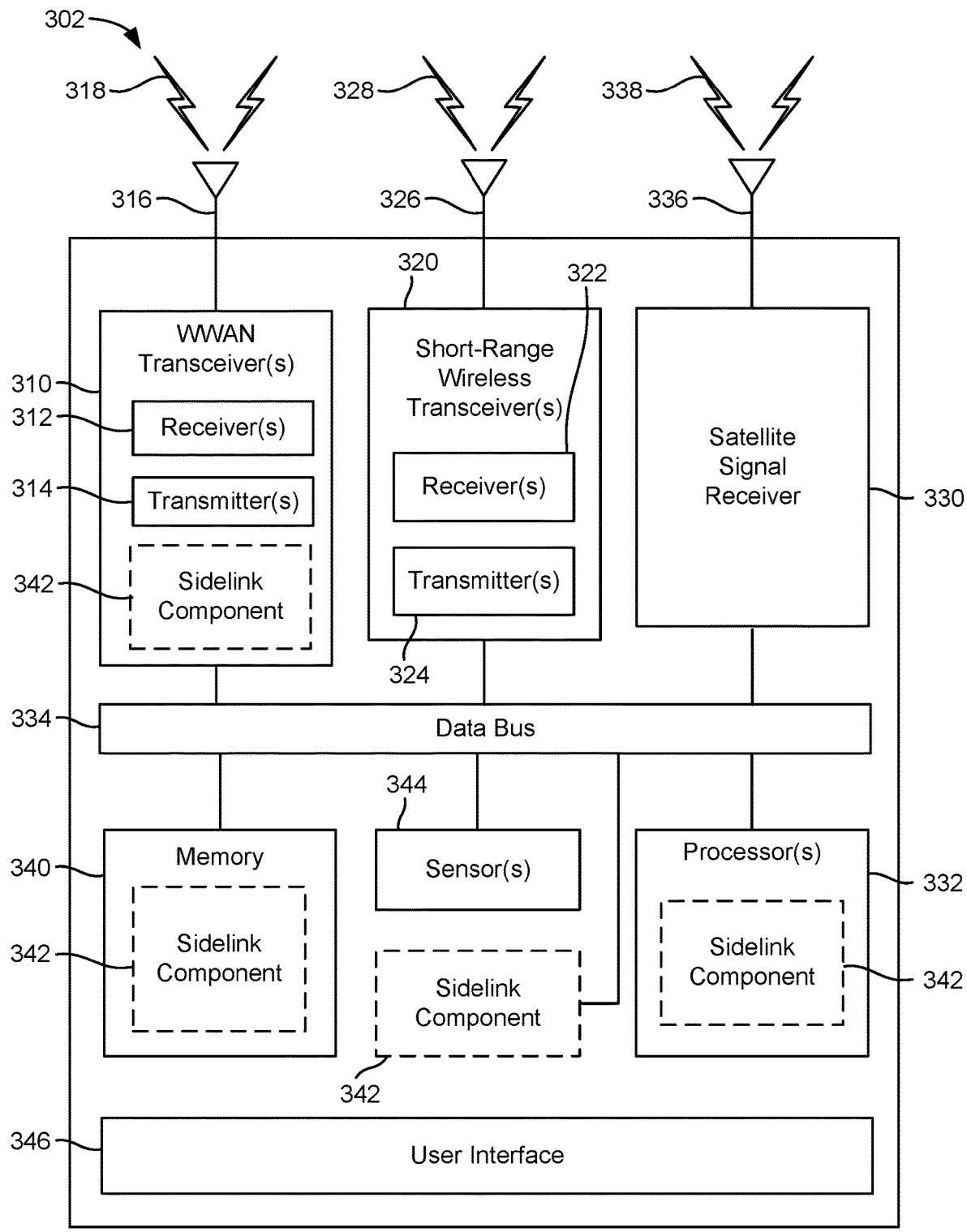
FIGS. 3A, 3B, and 3C are simplified block diagrams of several sample aspects of components that may be employed in a user equipment (UE), a base station, and a network entity, respectively, and configured to support communications as taught herein.
Figure 3B:
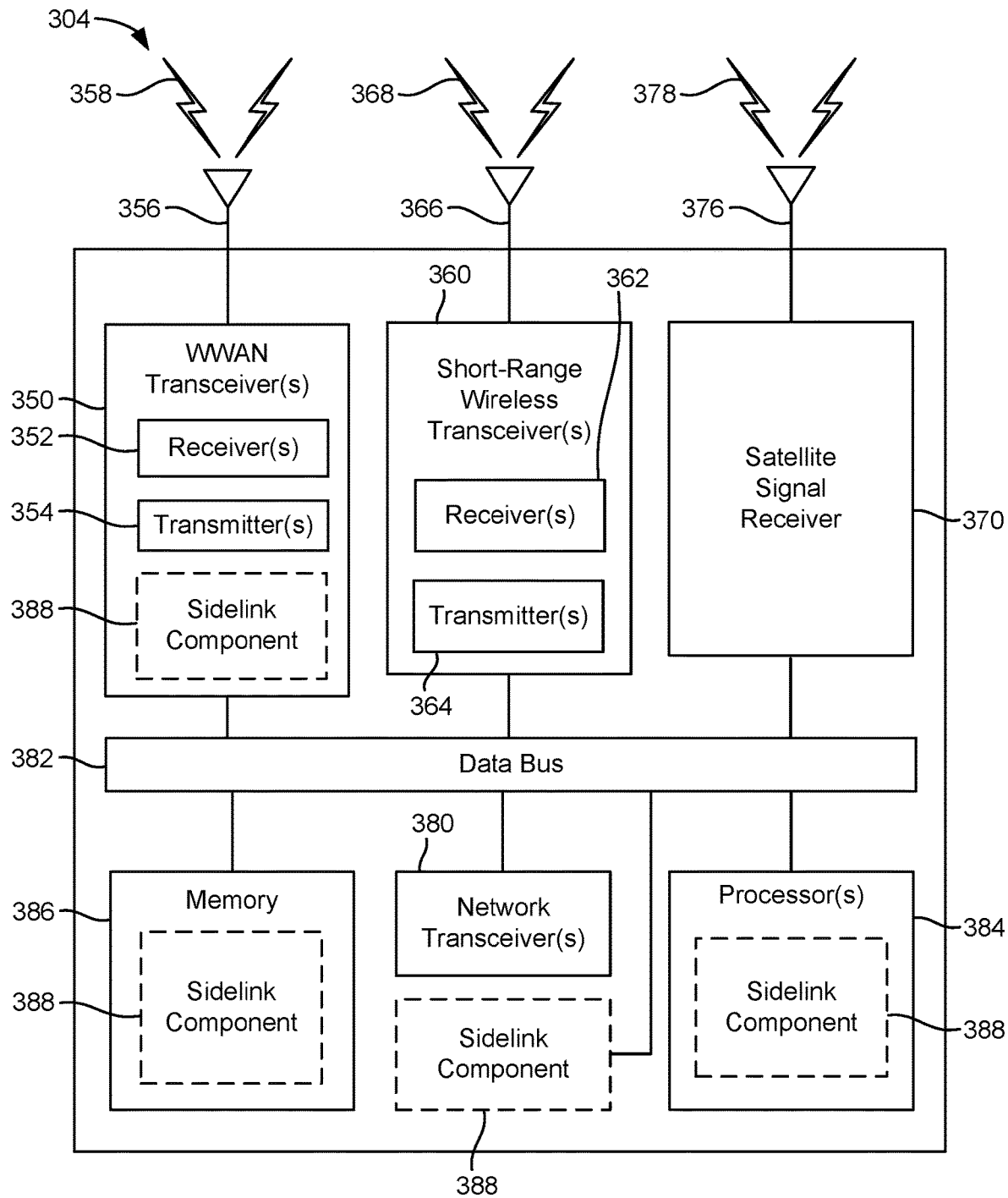
Figure 3C:
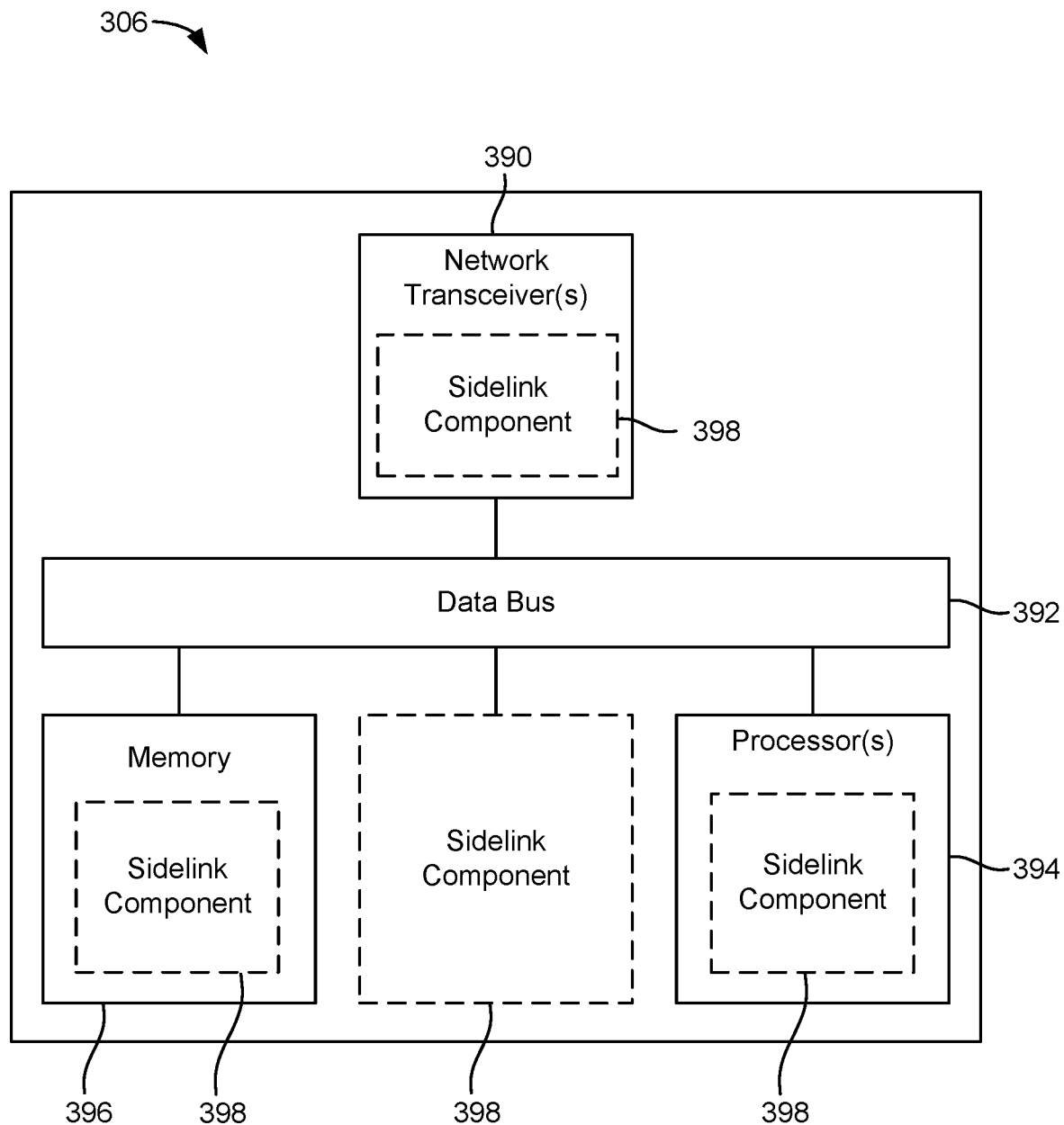

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PCS, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sidelink component 342, 388, and 398, respectively. The sidelink component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sidelink component 342, 388, and 398 may be external to the processors 332, 384, and 394 (e.g., part of a modem processing system, integrated with another processing system, etc.). Alternatively, the sidelink component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sidelink component 342, which may be, for example, part of the one or more WWAN transceivers 310, the memory 340, the one or more processors 332, or any combination thereof, or may be a standalone component. FIG. 3B illustrates possible locations of the sidelink component 388, which may be, for example, part of the one or more WWAN transceivers 350, the memory 386, the one or more processors 384, or any combination thereof, or may be a standalone component. FIG. 3C illustrates possible locations of the sidelink component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIB s)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TB s, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sidelink component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
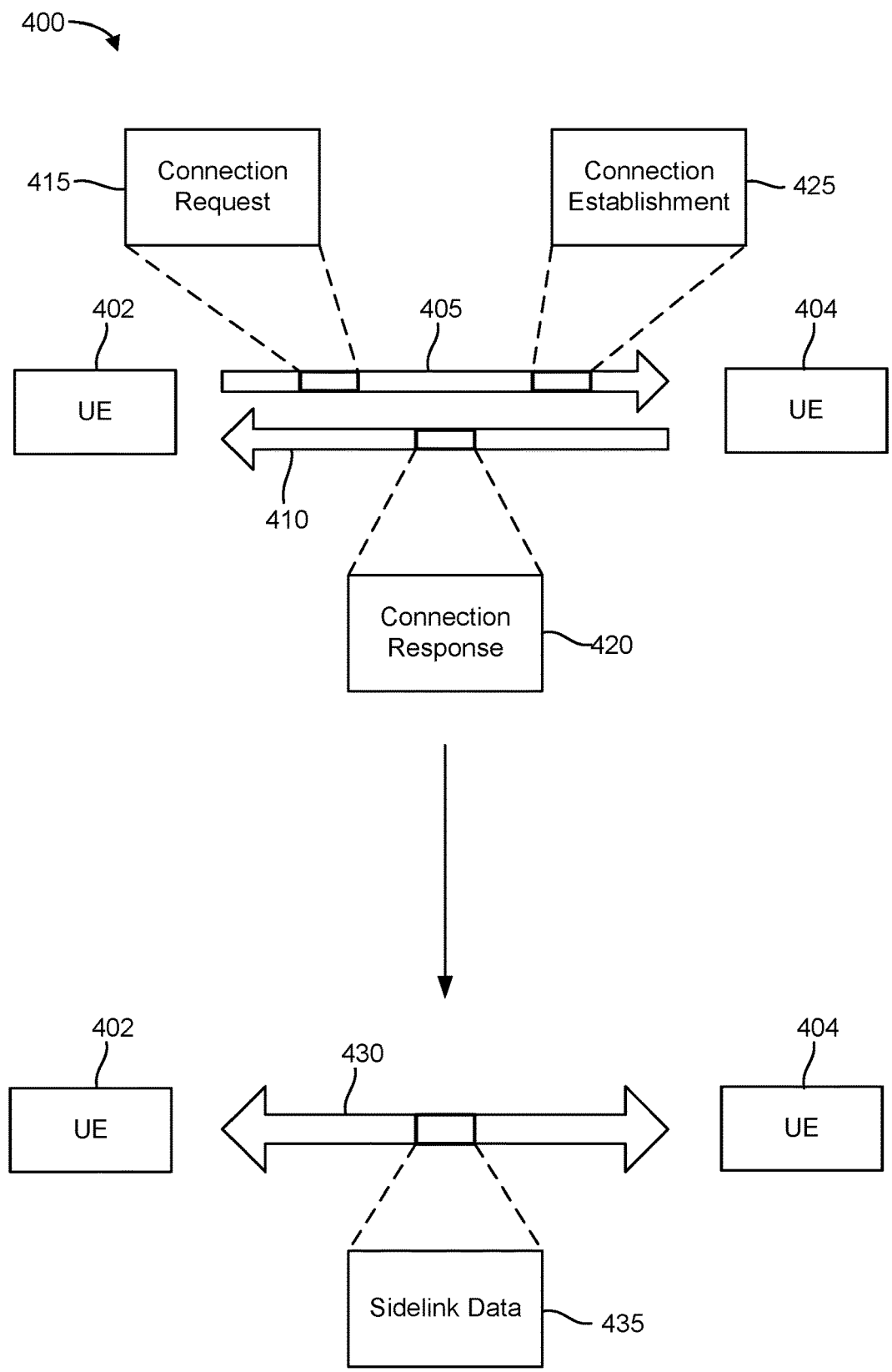
FIG. 4 illustrates an example of a wireless communications system that supports unicast sidelink establishment, according to aspects of the disclosure.

FIG. 4 illustrates an example of a wireless communications system 400 that supports wireless unicast sidelink establishment, according to aspects of the disclosure. In some examples, wireless communications system 400 may implement aspects of wireless communications systems 100, 200, and 250. Wireless communications system 400 may include a first UE 402 and a second UE 404, which may be examples of any of the UEs described herein. As specific examples, UEs 402 and 404 may correspond to V-UEs 160 in FIG. 1, UE 190 and UE 104 in FIG. 1 connected over D2D P2P link 192, or UEs 204 in FIGS. 2A and 2B.

In the example of FIG. 4, the UE 402 may attempt to establish a unicast connection over a sidelink with the UE 404, which may be a V2X sidelink between the UE 402 and UE 404. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 402 may be referred to as an initiating UE that initiates the sidelink connection procedure, and the UE 404 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 402 and UE 404. For example, a transmission and reception capability matching may be negotiated between the UE 402 and UE 404. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 402 and UE 404. Additionally, a security association may be established between UE 402 and UE 404 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 402 and UE 404.

In some cases, UE 404 may create a service announcement (e.g., a service capability message) to transmit over a cellular network (e.g., cV2X) to assist the sidelink connection establishment. Conventionally, UE 402 may identify and locate candidates for sidelink communications based on a basic service message (BSM) broadcasted unencrypted by nearby UEs (e.g., UE 404). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 402 is able to detect the BSM(s). Accordingly, the service announcement transmitted by UE 404 and other nearby UEs (e.g., a discovery signal) may be an upper layer signal and broadcasted (e.g., in an NR sidelink broadcast). In some cases, the UE 404 may include one or more parameters for itself in the service announcement, including connection parameters and/or capabilities it possesses. The UE 402 may then monitor for and receive the broadcasted service announcement to identify potential UEs for corresponding sidelink connections. In some cases, the UE 402 may identify the potential UEs based on the capabilities each UE indicates in their respective service announcements.

The service announcement may include information to assist the UE 402 (e.g., or any initiating UE) to identify the UE transmitting the service announcement (UE 404 in the example of FIG. 4). For example, the service announcement may include channel information where direct communication requests may be sent. In some cases, the channel information may be RAT-specific (e.g., specific to LTE or NR) and may include a resource pool within which UE 402 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 402 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 404 in the example of FIG. 4), the initiating UE (UE 402 in the example of FIG. 4) may transmit a connection request 415 to the identified target UE 404. In some cases, the connection request 415 may be a first RRC message transmitted by the UE 402 to request a unicast connection with the UE 404 (e.g., an "RRCSetupRequest" message). For example, the unicast connection may utilize the PC5 interface for the sidelink, and the connection request 415 may be an RRC connection setup request message. Additionally, the UE 402 may use a sidelink signaling radio bearer 405 to transport the connection request 415.

After receiving the connection request 415, the UE 404 may determine whether to accept or reject the connection request 415. The UE 404 may base this determination on a transmission/reception capability, an ability to accommodate the unicast connection over the sidelink, a particular service indicated for the unicast connection, the contents to be transmitted over the unicast connection, or a combination thereof. For example, if the UE 402 wants to use a first RAT to transmit or receive data, but the UE 404 does not support the first RAT, then the UE 404 may reject the connection request 415. Additionally or alternatively, the UE 404 may reject the connection request 415 based on being unable to accommodate the unicast connection over the sidelink due to limited radio resources, a scheduling issue, etc. Accordingly, the UE 404 may transmit an indication of whether the request is accepted or rejected in a connection response 420. Similar to the UE 402 and the connection request 415, the UE 404 may use a sidelink signaling radio bearer 410 to transport the connection response 420. Additionally, the connection response 420 may be a second RRC message transmitted by the UE 404 in response to the connection request 415 (e.g., an "RRCResponse" message).

In some cases, sidelink signaling radio bearers 405 and 410 may be the same sidelink signaling radio bearer or may be separate sidelink signaling radio bearers. Accordingly, a radio link control (RLC) layer acknowledged mode (AM) may be used for sidelink signaling radio bearers 405 and 410. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 420 indicates that the UE 404 accepted the connection request 415, the UE 402 may then transmit a connection establishment 425 message on the sidelink signaling radio bearer 405 to indicate that the unicast connection setup is complete. In some cases, the connection establishment 425 may be a third RRC message (e.g., an "RRCSetupComplete" message). Each of the connection request 415, the connection response 420, and the connection establishment 425 may use a basic capability when being transported from one UE to the other UE to enable each UE to be able to receive and decode the corresponding transmission (e.g., the RRC messages).

Additionally, identifiers may be used for each of the connection request 415, the connection response 420, and the connection establishment 425. For example, the identifiers may indicate which UE 402/404 is transmitting which message and/or for which UE 402/404 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 415 and/or the connection response 420 for UE 402 and/or UE 404, respectively, to enable negotiation of corresponding AS layer parameters for the unicast connection. For example, the UE 402 and/or UE 404 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 402 and/or UE 404 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 402 and/or UE 404 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 402 and/or UE 404 may include PHY layer parameters when establishing the unicast connection to set a PHY layer context for the unicast connection. For example, the PHY layer context may indicate a transmission format (unless transmission profiles are included for each UE 402/404) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 425 message is transmitted). Before a security association (e.g., security context) is established between the UE 402 and UE 404, the sidelink signaling radio bearers 405 and 410 may not be protected. After a security association is established, the sidelink signaling radio bearers 405 and 410 may be protected. Accordingly, the security context may enable secure data transmissions over the unicast connection and the sidelink signaling radio bearers 405 and 410. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 404 may base its decision on whether to accept or reject the connection request 415 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 402 and UE 404 may communicate using the unicast connection over a sidelink 430, where sidelink data 435 is transmitted between the two UEs 402 and 404. The sidelink 430 may correspond to sidelinks 162 and/or 168 in FIG. 1. In some cases, the sidelink data 435 may include RRC messages transmitted between the two UEs 402 and 404. To maintain this unicast connection on sidelink 430, UE 402 and/or UE 404 may transmit a keep alive message (e.g., "RRCDirectLinkAlive" message, a fourth RRC message, etc.). In some cases, the keep alive message may be triggered periodically or on-demand (e.g., event-triggered). Accordingly, the triggering and transmission of the keep alive message may be invoked by UE 402 or by both UE 402 and UE 404. Additionally or alternatively, a MAC control element (CE) (e.g., defined over sidelink 430) may be used to monitor the status of the unicast connection on sidelink 430 and maintain the connection. When the unicast connection is no longer needed (e.g., UE 402 travels far enough away from UE 404), either UE 402 and/or UE 404 may start a release procedure to drop the unicast connection over sidelink 430. Accordingly, subsequent RRC messages may not be transmitted between UE 402 and UE 404 on the unicast connection.

NR is capable of supporting various sidelink ranging and positioning techniques. Sidelink-based ranging enables the determination of the relative distance(s) between UEs and optionally their absolute position(s), when the absolute position of at least one involved UE is known. This technique is valuable in situations where global navigation satellite system (GNSS) positioning is degraded or unavailable (e.g., tunnels, urban canyons, etc.) and can also enhance range and positioning accuracy when GNSS is available.

Sidelink-based ranging can be accomplished via the broadcast of positioning reference signals (PRS) from participating UEs (e.g., any UE capable of sidelink, V2X, V2V, etc. communication) and network entities (e.g., RSUs, gNBs, APs, etc.), followed by participants exchanging measurements based on the PRS transmission and reception. Based on these measurements, a participant (a UE or a network entity) can determine its range to the other participants. If at least one participant has accurate knowledge of its location, the result of the ranging exercise is a determination of location for the other participant(s). If none of the participants have knowledge of their location, the result is simply the determination of the inter-participant ranges.

For a UE to determine its location from a sidelink positioning procedure (also referred to as a sidelink ranging procedure, sidelink ranging session, sidelink ranging and positioning procedure, and the like), at least one participant in the procedure needs to have accurate knowledge of its location to serve as an "anchor" for the location calculation (i.e., an "anchor" is a device with a known location that can be used to determine the location of a device with an unknown location). Similarly, for a network entity managing sidelink positioning procedures (e.g., LMF, RSU, gNB), a prerequisite for determining the participants in a sidelink positioning procedure is knowing which, if any, UEs can serve as anchors. As such, having a mechanism for a UE to inform the network and/or other UEs whether it can serve as an anchor would enable more successful sidelink positioning and reduce over-the-air messaging/resource utilization by not initiating procedures if no suitable anchor is available.

Accordingly, the present disclosure provides a signaling mechanism for a UE to inform the network (and/or other UEs) of its capability to serve as an anchor for a sidelink positioning procedure. A UE may determine whether it can serve as an anchor for a sidelink positioning procedure based on various factors, such as whether it has a known location, the accuracy of that location (e.g., even if the UE has a known location, if the accuracy of that location is below a threshold, it may not serve as an anchor), the signal strength of messages received from the other participating UEs (e.g., weak signal strength may indicate that the UE is too far from the other UEs to provide reliable anchor service), the battery level of the UE, privacy settings (e.g., the UE will need to share its location if it provides anchor service), and the like. The information conveyed may include the UE's capability to serve as an anchor, its location, location accuracy, and its capability to perform sidelink positioning calculations based on receipt of measurements from other UEs. The information elements used to configure these parameters may be incorporated into existing 3GPP signaling messages or as part of a new message specific to sidelink positioning.

Figure 5:
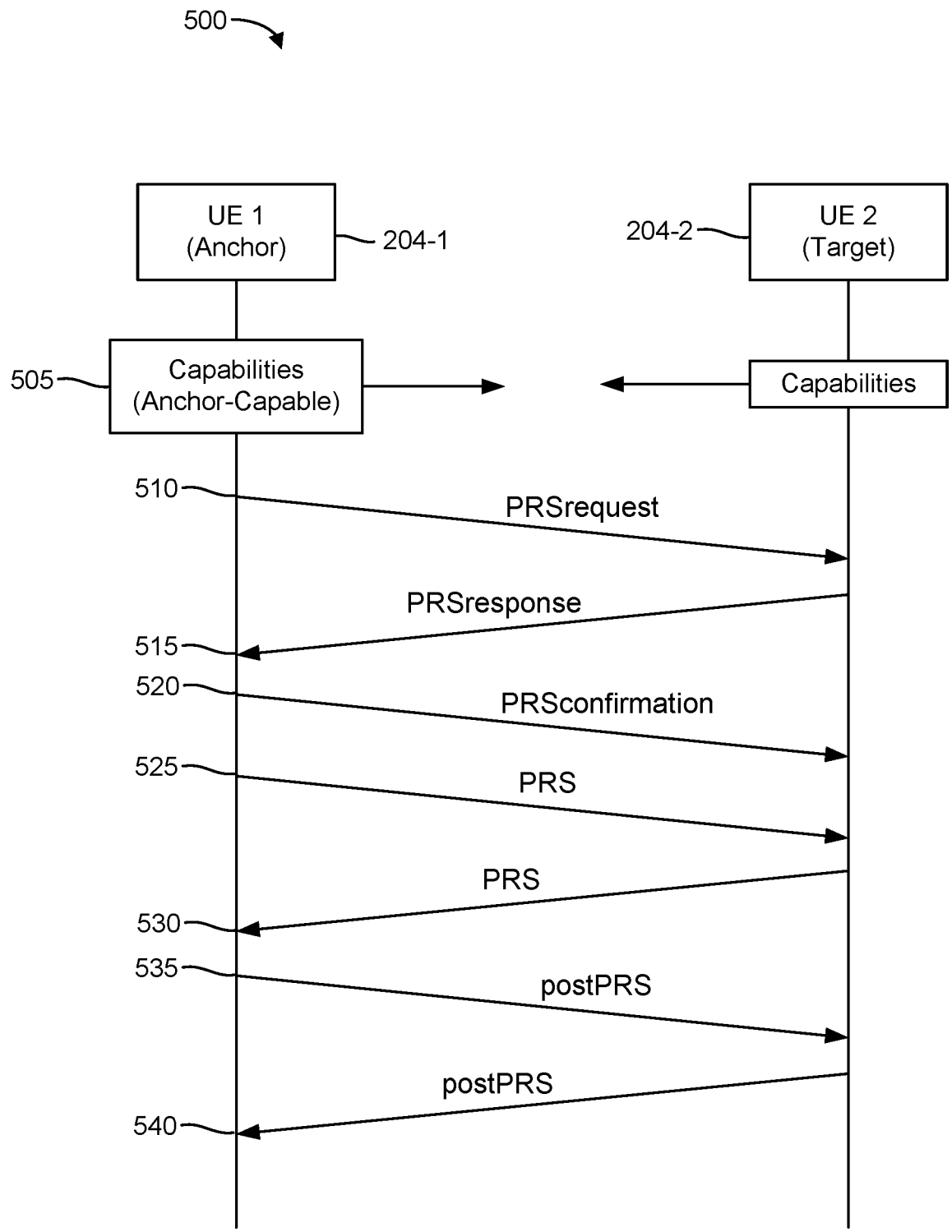
FIG. 5 is a diagram illustrating an example sidelink ranging and positioning procedure, according to aspects of the disclosure.

FIG. 5 illustrates an example sidelink ranging and positioning procedure 500, according to aspects of the disclosure. Sidelink ranging is based on calculating an inter-UE round-trip-time (RTT) measurement, as determined from the transmit and receive times of PRS (a wideband reference signal defined in LTE and NR for positioning). Each UE reports an RTT measurement to all other participating UEs, along with its location (if known). For UEs having zero or inaccurate knowledge of their location, the RTT procedure yields an inter-UE range between the involved UEs. For UEs having accurate knowledge of their location, the range yields an absolute location. UE participation, PRS transmission, and subsequent RTT calculation is coordinated by an initial three-way messaging handshake (a PRS request, a PRS response, and a PRS confirmation), and a message exchange after PRS transmission (post PRS messages) to share measurements after receiving a peer UE's PRS.

The sidelink ranging and positioning procedure 500 (or session) begins with the broadcast of capability information by the involved peer UEs at stage 505. As shown in FIG. 5, one of the peer UEs, UE 204-1 (e.g., any of the sidelink-capable UEs described herein), is capable of being an anchor UE for the sidelink ranging and positioning procedure 500, meaning it has a known location. As such, the anchor UE 204-1 includes an indication in its capability message(s) that it is capable of being an anchor UE for the sidelink ranging and positioning procedure 500. The capability message(s) may also include the location of the anchor UE 204-1, or this may be provided later. The other UE, UE 204-2 (e.g., any other of the sidelink-capable UEs described herein), is a target UE, meaning it has an unknown or inaccurate location and is attempting to be located. Based on the capability information received from the anchor UE 204-1, indicating that the anchor UE 204-1 is an anchor UE, the target UE 204-2 knows that it will be able to determine its location based on performing the sidelink ranging and positioning procedure 500 with the anchor UE 204-1.

After the initial capability exchange, the involved UEs 204 perform a three-way messaging handshake. At stage 510, the anchor UE 204-1 transmits a PRS request (labeled "PRSrequest") to the target UE 204-2. At stage 515, the target UE 204-2 transmits a PRS response (labeled "PRSresponse") to the anchor UE 204-1. At stage 520, the anchor UE 204-1 transmits a PRS confirmation to the target UE 204-2. At this point, the three-way messaging handshake is complete.

At stages 525 and 530, the involved peer UEs 204 transmit PRS to each other. The resources on which the PRS are transmitted may be configured/allocated by the network (e.g., one of the UE's 204 serving base station) or negotiated by the UEs 204 during the three-way messaging handshake. The anchor UE 204-1 measures the transmission-to-reception (Tx-Rx) time difference between the transmission time of PRS at stage 525 and the reception time of PRS at stage 530. The target UE 204-2 measures the reception-to-transmission (Rx-Tx) time difference between the reception time of PRS at stage 525 and the transmission time of PRS at stage 530.

At stages 535 and 540, the peer UEs 204 exchange their respective time difference measurements in post PRS messages (labeled "postPRS"). If the anchor UE 204-1 has not yet provided its location to the target UE 204-2, it does so at this point. Each UE 204 is then able to determine the RTT between each UE 204 based on the Tx-Rx and Rx-Tx time difference measurements (specifically, the difference between the Tx-Rx and Rx-Tx time difference measurements). Based on the RTT measurement and the speed of light, each UE 204 can then estimate the distance (or range) between the two UEs 204 (specifically, half the RTT measurement multiplied by the speed of light). Since the target UE 204-2 also has the absolute location (e.g., geographic coordinates) of the anchor UE 204-1, the target UE 204-2 can use that location and the distance to the anchor UE 204-1 to determine its own absolute location.

Note that while FIG. 5 illustrates two UEs 204, a UE may perform, or attempt to perform, the sidelink ranging and positioning procedure 500 with multiple UEs.

Figure 6:
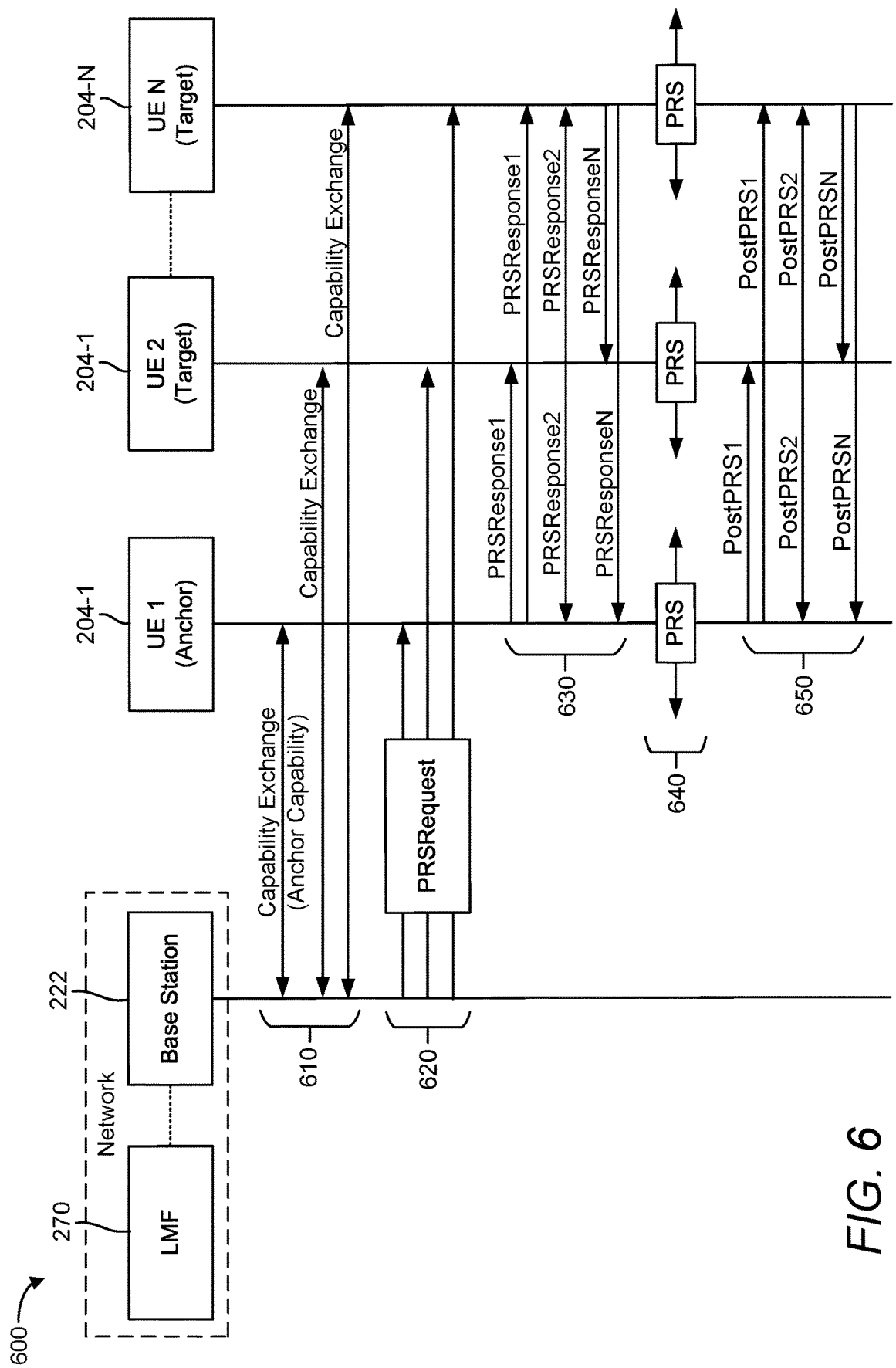
FIG. 6 illustrates an example of a network-managed sidelink ranging and positioning procedure, according to aspects of the disclosure.
Figure 7:
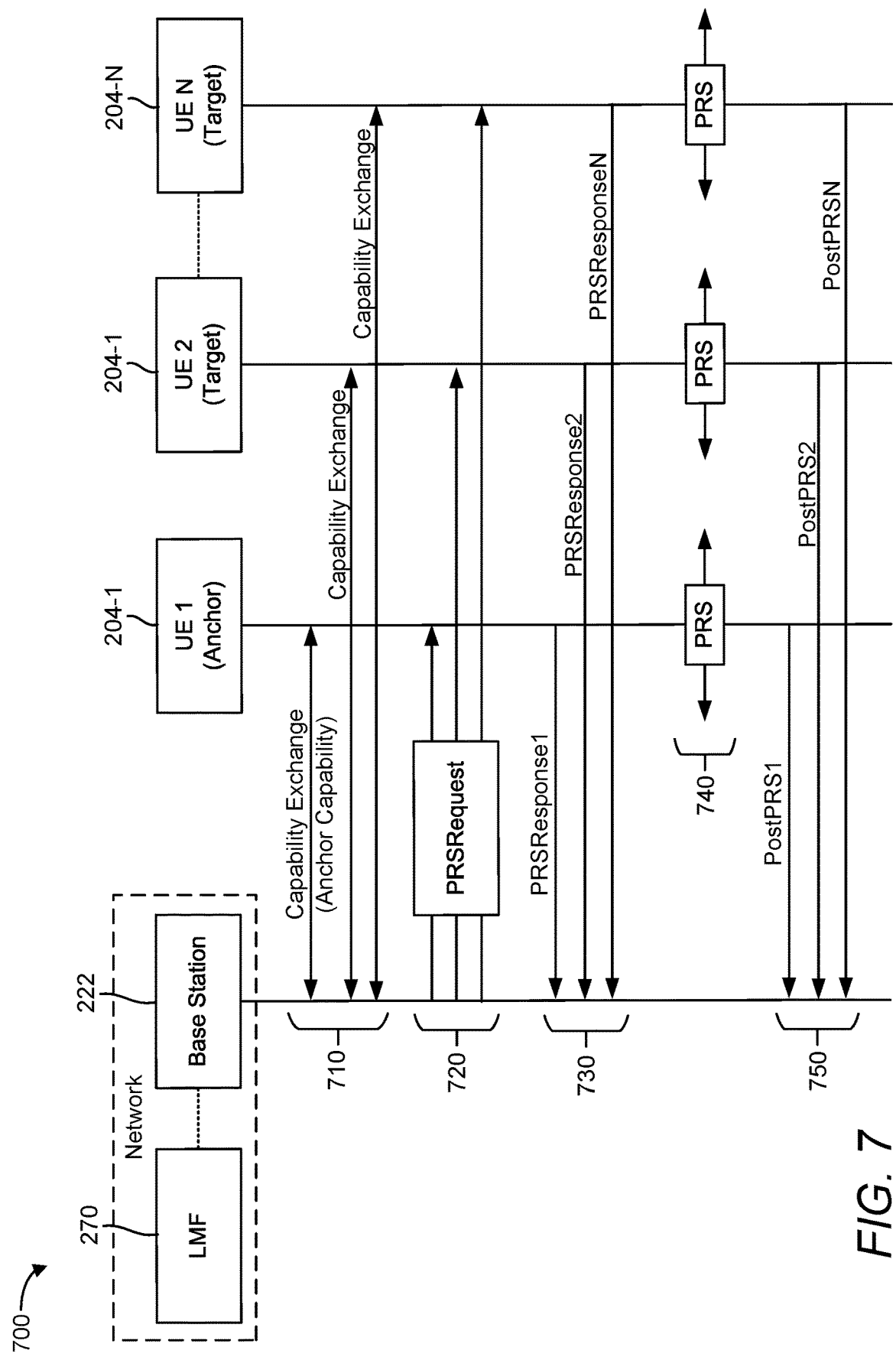
FIG. 7 illustrates another example of a network-managed sidelink ranging and positioning procedure, according to aspects of the disclosure.

The network (e.g., gNB, RSU, LMF) can manage sidelink positioning procedures by assigning an anchor UE (or UEs) to a sidelink positioning procedure based on capability exchanges with participating UEs. There are two types of network-managed sidelink ranging and positioning procedures, illustrated in FIGS. 6 and 7. In FIG. 6, the network selects the anchor UE and the target UEs determine their own locations based on the location of the anchor UE. In FIG. 7, the network selects the anchor UE and the involved UEs report their measurements to the network, which determines the locations of the target UEs.

FIG. 6 illustrates an example of a network-managed sidelink ranging and positioning procedure 600, according to aspects of the disclosure. The network-managed sidelink ranging and positioning procedure 600 (or session) begins at stage 610 with the exchange of capability information between the involved peer UEs 204 and a gNB 222. As shown in FIG. 6, one of the peer UEs, anchor UE 204-1 (e.g., any of the sidelink-capable UEs described herein), includes an indication in its capability message(s) that it is capable of being an anchor UE. The other UEs, UE 204-2 to UE 204-N (e.g., any other of the sidelink-capable UEs described herein), are target UEs.

Based on the capabilities received at stage 610, the gNB 222 determines that the anchor UE 204-1 can act as an anchor for the network-managed sidelink ranging and positioning procedure 600. The gNB 222 assigns the anchor UE 204-1 and the target UEs 204-2 to 204-N to a sidelink positioning group and transmits a PRS request (labeled "PRSrequest") to each of the involved UE 204 at stage 620. The PRS request indicates the sidelink positioning group to which the peer UEs 204 have been assigned, and may indicate the time and frequency resources on which the UEs 204 are to transmit PRS.

At stage 630, the peer UEs 204 transmit PRS responses (labeled "PRSresponse1," "PRSresponse2," "PRSresponseN,") to each other, and at stage 640, the peer UEs 204 transmit PRS to each other. The UEs 204 measure the Tx-Rx and Rx-Tx time differences of the PRS transmitted and received at stage 640. For example, each UE 204 may perform stages 525 and 530 with each other to determine the Tx-Rx and Rx-Tx time differences. At stage 650, the UEs 204 report their respective time difference measurements and/or their RTTs to each other in post PRS messages (labeled "PostPRS1," "PostPRS2," "PostPRSN"), as at stages 535 and 540 of FIG. 5. If the anchor UE 204-1 has not yet provided its location to the target UEs 204-2 to 204-N, it does so at this point. The peer UEs 204 are now able to determine the RTTs and/or the distances between themselves. Based on the distances between the target UEs 204-2 to 204-N and the known location of the anchor UE 204-1, each target UE 204-2 to 204-N can determine its locations.

FIG. 7 illustrates another example of a network-managed sidelink ranging and positioning procedure 700, according to aspects of the disclosure. The network-managed sidelink ranging and positioning procedure 700 (or session) begins at stage 710 with the exchange of capability information between the involved peer UEs 204 and a gNB 222. As shown in FIG. 7, one of the peer UEs, anchor UE 204-1 (e.g., any of the sidelink-capable UEs described herein), includes an indication in its capability message(s) that it is capable of being an anchor UE. The other UEs, UE 204-2 to UE 204-N (e.g., any other of the sidelink-capable UEs described herein), are target UEs.

Based on the capabilities received at stage 710, the gNB 222 determines that the anchor UE 204-1 can act as an anchor for the network-managed sidelink ranging and positioning procedure 700. The gNB 222 assigns the anchor UE 204-1 and the target UEs 204-2 to 204-N to a sidelink positioning group and transmits a PRS request ("PRSrequest") to each of the involved UEs 204 at stage 720. The PRS request indicates the sidelink positioning group to which the peer UEs 204 have been assigned, and may indicate the time and frequency resources on which the UEs 204 are to transmit PRS.

At stage 730, each peer UE 204 transmits a PRS response (labeled "PRSresponse1," "PRSresponse2," "PRSresponseN") to the gNB 222. At stage 740, the peer UEs 204 transmit PRS to each other. The UEs 204 measure the Tx-Rx and Rx-Tx time differences of the PRS transmitted and received at stage 740. For example, each UE 204 may perform stages 525 and 530 with each other to determine the Tx-Rx and Rx-Tx time differences.

At stage 750, the UEs 204 report their respective time difference measurements, their RTTs, and/or the relative distances between each other to the gNB 222 in post PRS messages (labeled "PostPRS1," "PostPRS2," "PostPRSN"). If the anchor UE 204-1 has not yet provided its location to the g-NB 222, it does so at this point. The gNB 222 or the LMF 270 is now able to determine the RTTs or distances between the UEs 204, if not provided by the UEs 204. Based on the distances between the UE 204 and the known location of the anchor UE 204-1, the gNB 222 or LMF 270 can determine the locations of the target UE 204-2 to 204-N.

Figure 8:
FIG. 8 illustrates an example positioning anchor capability information element, according to aspects of the disclosure.

A UE may signal its capability to serve as an anchor UE for sidelink positioning procedures (e.g., as at stages 505, 610, 710 of FIGS. 5, 6, 7) using various information elements. FIG. 8 illustrates an example positioning anchor capability information element 800, according to aspects of the disclosure. In the example of FIG. 8, the positioning anchor capability information element 800 is named "sl-PositionAnchorCapability," but as will be appreciated, this is merely an example. The positioning anchor capability information element 800 may be an RRC information element exchanged between a UE and a base station or between two UEs. The positioning anchor capability information element 800 may include the following fields:

TABLE 1 sl-PositionAnchor
If UE is capable of providing sidelink positioning anchor service (true).
sl-PositionAnchorCalculation
If UE is capable of providing sidelink positioning anchor service calculation of position based on received location measurement information (true).
Location Coordinate-r16
Parameter type "LocationCoordinates" defined in 3GPP Technical Specification (TS) 37.355. The first/leftmost bit of the first octet contains the most significant bit.

FIGS. 9A and 9B illustrate example information elements that may be exchanged between two UEs to request and provide a UE's anchor capability status, according to aspects of the disclosure. As shown in FIG. 9A, a first UE (labeled "UE1") and a second UE (labeled "UE2") perform a capability exchange procedure 900. This may be the capability exchange procedure performed at stage 505 of FIG. 5.

At the first stage of the capability exchange procedure 900, the first UE receives a capability enquiry message 910 (e.g., a "UECapabilityEnquirySidelink" message) from the second UE. The capability enquiry message 910 includes a "UECapabilityEnquirySidelink" information element, which includes at least one "UECapabilityEnquirySidelink-IEs-r16" information element. The "UECapabilityEnquirySidelink-IEs-r16" information element includes a "sl-PositionAnchorCapabilityStatus" field that points to a "sl-PositionAnchorCapability" information element (e.g., positioning anchor capability information element 800). The "sl-PositionAnchorCapability" information element requests an indication 912 of whether the UE is capable of being an anchor for a sidelink positioning procedure. At the second stage of the capability exchange procedure 900, the first UE responds to the capability enquiry message with a capability information message 930 (e.g., a "UECapabilityInformationSidelink" message). The capability information message 930 includes a "UECapabilityInformationSidelink" information element, which includes at least one "UECapabilityInformationSidelink-IEs-r16" information element. The "UECapabilityInformationSidelink-IEs-r16" information element includes a "sl-PositionAnchorCapabilityStatus" field that points to a "sl-PositionAnchorCapability" information element (e.g., positioning anchor capability information element 800). The "sl-PositionAnchorCapability" information element indicates (is an indication 932 of) whether the UE is capable of being an anchor for a sidelink positioning procedure.

Note that while FIGS. 9A and 9B have illustrated "sl-PositionAnchorCapabilityStatus" fields and "sl-PositionAnchorCapability" information elements added to existing RRC messages, as will be appreciated, these fields and information elements may instead be provided in new RRC messages.

FIGS. 10A and 10B illustrate example information elements that may be exchanged between a UE and a network entity to request and provide the UE's anchor capability status, according to aspects of the disclosure. As shown in FIG. 10A, a UE and a network entity (labeled "NW") perform a capability exchange procedure 1000. This may be the capability exchange procedure performed at stages 610 and 710 of FIGS. 6 and 7.

At the first stage of the capability exchange procedure 1000, the UE receives a capability enquiry message 1010 (e.g., a "UECapabilityEnquiry" message) from the network entity (e.g., a base station, a location server). The capability enquiry message 1010 may include various "UECapabilityEnquiry" information elements. A "UECapabilityEnquiry-v1610-IEs" information element includes a "sl-PositionAnchorCapabilityStatus" field that points to a "sl-PositionAnchorCapability" information element (e.g., positioning anchor capability information element 800). The "sl-PositionAnchorCapability" information element requests an indication 1012 of whether the UE is capable of being an anchor for a sidelink positioning procedure.

At the second stage of the capability exchange procedure 1000, the UE responds to the capability enquiry message with a capability information message 1030 (e.g., a "UECapabilityInformation" message). The capability information message 1030 includes a "UECapabilityInformation" information element, which may includes at least one "UECapabilityInformation-IEs-r16" information element. The "UECapabilityInformation-IEs-r16" information element may include a "sl-PositionAnchorCapability Status" field that points to a "sl-PositionAnchorCapability" information element (e.g., positioning anchor capability information element 800). The "sl-PositionAnchorCapability" information element indicates (is an indication 1032 of) whether the UE is capable of being an anchor for a sidelink positioning procedure.

Note that while FIGS. 10A and 10B have illustrated "sl-PositionAnchorCapabilityStatus" fields and "sl-PositionAnchorCapability" information elements added to existing "UECapabilityEnquiry" and "UECapabilityInformation" RRC messages, these fields and information elements may instead be added to existing "UEInformationRequest" and "UEInformationReponse" RRC messages. Alternatively, these fields and information elements may instead be provided in new RRC messages.

Figure 11:
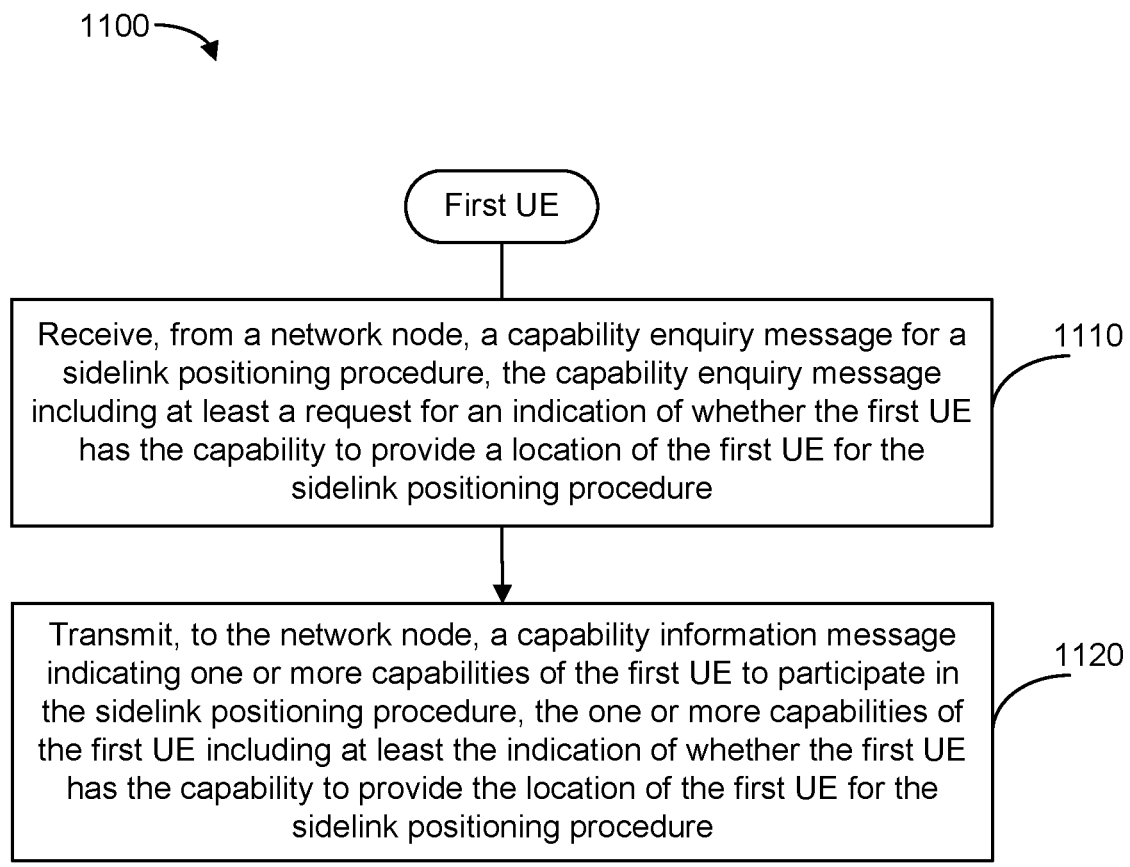
FIGS. 11 and 12 illustrate example methods of wireless communication, according to aspects of the disclosure.

FIG. 11 illustrates an example method 1100 of wireless communication, according to aspects of the disclosure. In an aspect, method 1100 may be performed by a first UE (e.g., any of the UEs described herein).

At 1110, the first UE receives, from a network node (e.g., a base station, location server, another UE), a capability enquiry message for a sidelink positioning procedure (e.g., a "UECapabilityEnquirySidelink" or "UECapabilityEnquiry" message), the capability enquiry message including at least a request for an indication of whether the first UE has the capability to provide a location of the first UE (i.e., serve as an anchor) for the sidelink positioning procedure (e.g., via a "sl-PositionAnchorCapability" information element). In an aspect, operation 1110 may be performed by the one or more WWAN transceivers 310, the one or more processors 332, memory 340, and/or sidelink component 342, any or all of which may be considered means for performing this operation.

At 1120, the first UE transmits, to the network node, a capability information message indicating one or more capabilities of the first UE to participate in the sidelink positioning procedure (e.g., a "UECapabilityInformationSidelink" or "UECapabilityInformation" message), the one or more capabilities of the first UE including at least the indication of whether the first UE has the capability to provide the location of the first UE for the sidelink positioning procedure (e.g., via a "sl-PositionAnchorCapability" information element). In an aspect, operation 1120 may be performed by the one or more WWAN transceivers 310, the one or more processors 332, memory 340, and/or sidelink component 342, any or all of which may be considered means for performing this operation.

Figure 12:
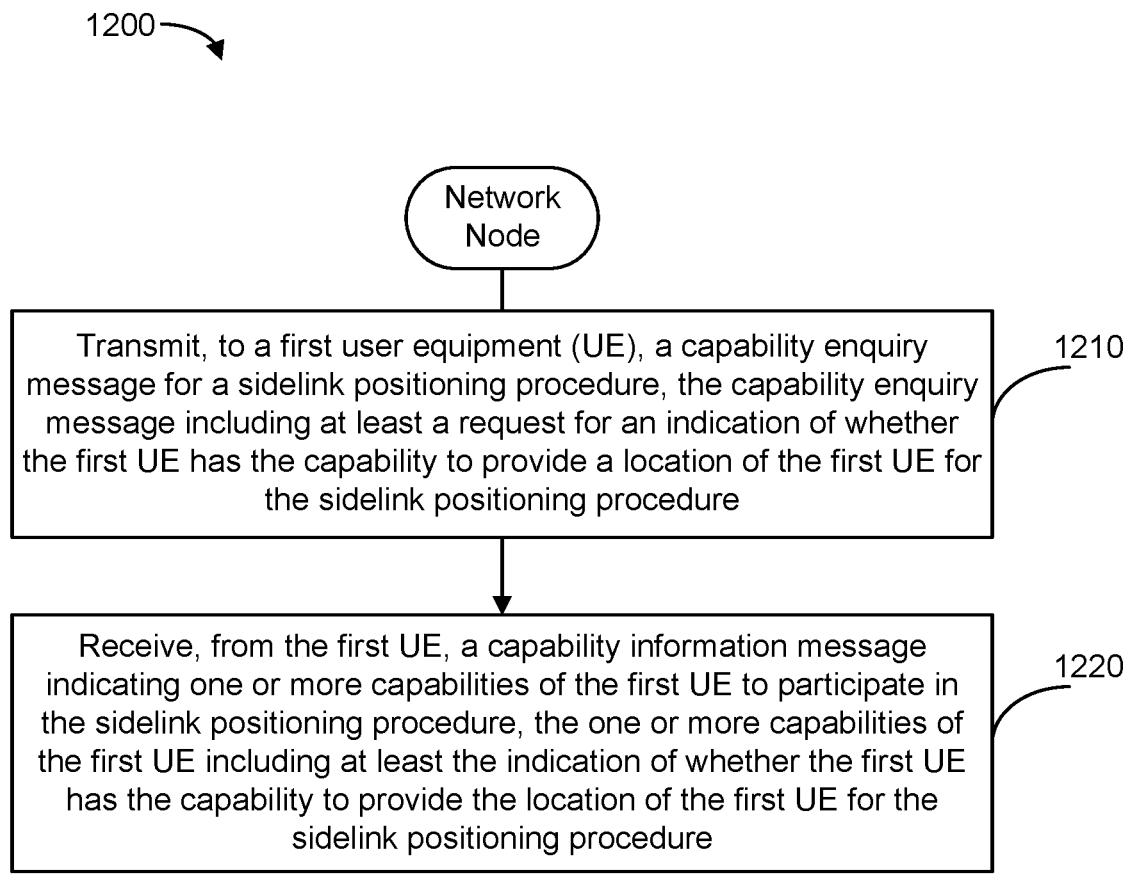

FIG. 12 illustrates an example method 1200 of wireless communication, according to aspects of the disclosure. In an aspect, method 1200 may be performed by a network node (e.g., any of the base stations, UEs, or location servers described herein).

At 1210, the network node transmits, to a first UE (e.g., any of the UEs described herein), a capability enquiry message for a sidelink positioning procedure (e.g., a "UECapabilityEnquirySidelink" or "UECapabilityEnquiry" message), the capability enquiry message including a request for an indication of whether the first UE has the capability to provide a location of the first UE for the sidelink positioning procedure (e.g., via a "sl-PositionAnchorCapability" information element). In an aspect, where the network node is a UE (e.g., a target UE), operation 1210 may be performed by the one or more WWAN transceivers 310, the one or more processors 332, memory 340, and/or sidelink component 342, any or all of which may be considered means for performing this operation. In an aspect, where the network node is a base station, operation 1210 may be performed by the one or more WWAN transceivers 350, the one or more processors 384, memory 386, and/or sidelink component 388, any or all of which may be considered means for performing this operation. In an aspect, where the network node is a location server, operation 1210 may be performed by the one or more network transceivers 390, the one or more processors 394, memory 396, and/or sidelink component 398, any or all of which may be considered means for performing this operation.

At 1220, the network node receives, from the first UE, a capability information message indicating one or more capabilities of the first UE to participate in the sidelink positioning procedure (e.g., a "UECapabilityInformationSidelink" or "UECapabilityInformation" message), the one or more capabilities of the first UE including at least the indication of whether the first UE has the capability to provide the location of the first UE for the sidelink positioning procedure (e.g., via a "sl-PositionAnchorCapability" information element). In an aspect, where the network node is a UE (e.g., a target UE), operation 1220 may be performed by the one or more WWAN transceivers 310, the one or more processors 332, memory 340, and/or sidelink component 342, any or all of which may be considered means for performing this operation. In an aspect, where the network node is a base station, operation 1220 may be performed by the one or more WWAN transceivers 350, the one or more processors 384, memory 386, and/or sidelink component 388, any or all of which may be considered means for performing this operation. In an aspect, where the network node is a location server, operation 1220 may be performed by the one or more network transceivers 390, the one or more processors 394, memory 396, and/or sidelink component 398, any or all of which may be considered means for performing this operation.

As will be appreciated, the methods 1100 and 1200 enable the first UE to provide, and the network node (a base station, location server, or another UE) to receive, the first UE's capability to act as an anchor for a sidelink positioning procedure. This enables more successful sidelink positioning and reduces over-the-air messaging/resource utilization by not initiating procedures if no suitable anchor is available.

Figure 13:
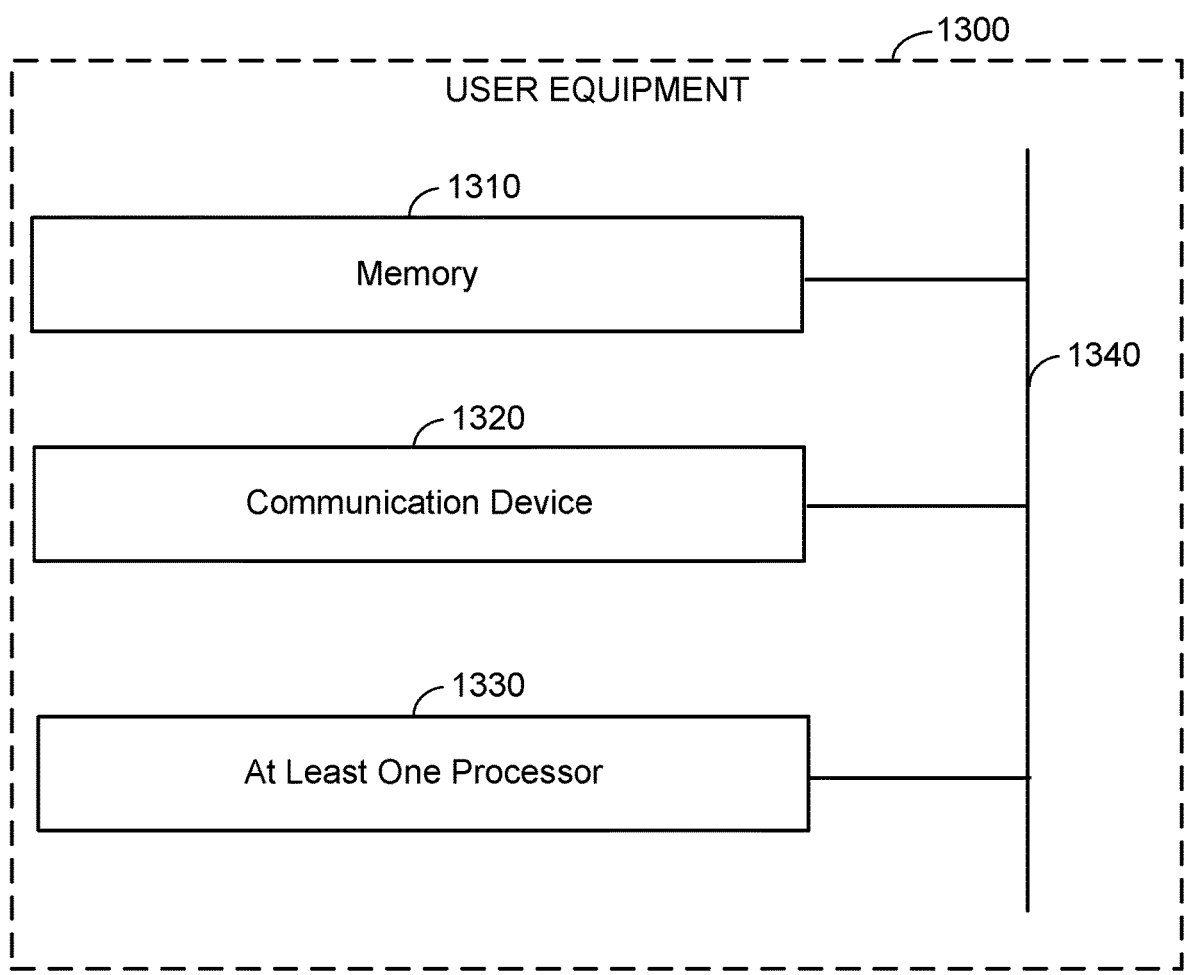
FIGS. 13 to 16 are simplified block diagrams of various apparatuses configured to support wireless communication operations as taught herein.

FIG. 13 illustrates an example user equipment 1300, according to aspects of the disclosure. The user equipment 1300 may include a memory 1310, a communication device 1320, and at least one processor 1330. The memory 1310, the communication device 1320, and the at least one processor 1330 may be coupled to each other over a data bus 1340. In an aspect, the memory 1310 may correspond to memory 340 and/or sidelink component 342, the communication device 1320 may correspond to the one or more WWAN transceivers 310 and/or sidelink component 342, and the at least one processor 1330 may correspond to the one or more processors 332 and/or sidelink component 342.

In an aspect, the memory 1310 and the at least one processor 1330 may be configured to: receive, from a network node, a capability enquiry message for a sidelink positioning procedure, the capability enquiry message including at least a request for an indication of whether the user equipment 1300 has the capability to provide a location of the first UE for the sidelink positioning procedure; and transmit, to the network node, a capability information message indicating one or more capabilities of the user equipment 1300 to participate in the sidelink positioning procedure, the one or more capabilities of the user equipment 1300 including at least the indication of whether the user equipment 1300 has the capability to provide the location of the first UE for the sidelink positioning procedure.

Figure 14:
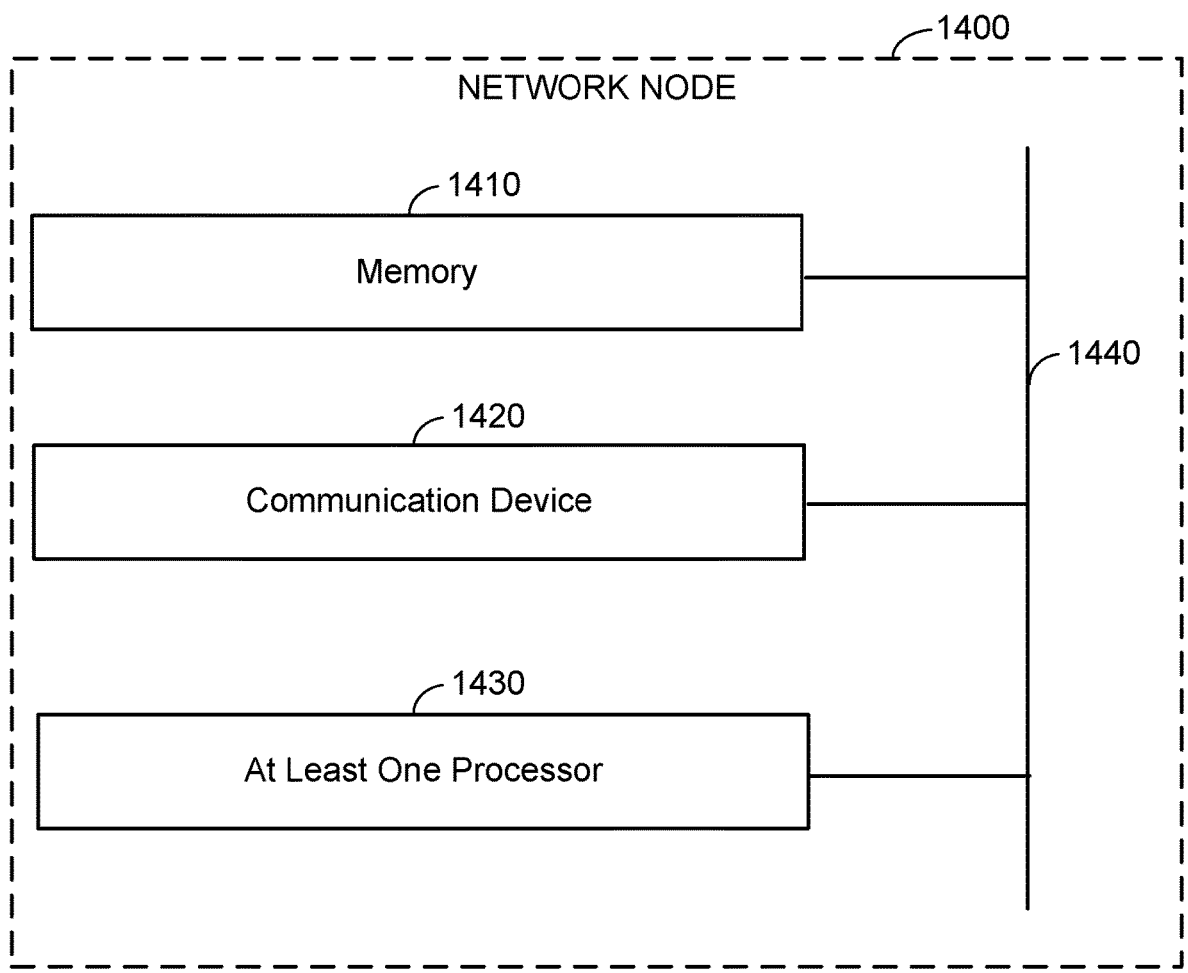

FIG. 14 illustrates an example network node 1400, according to aspects of the disclosure. The network node 1400 may include a memory 1410, a communication device 1420, and at least one processor 1430. The memory 1410, the communication device 1420, and the at least one processor 1430 may be coupled to each other over a data bus 1440. In an aspect, depending on whether the network node 1400 is a UE, a base station, or a location server, the memory 1410 may correspond to memory 340, 386, or 396 and/or sidelink component 342, 388, or 398, the communication device 1420 may correspond to the one or more transceivers 310, 350, or 390 and/or sidelink component 342, 388, or 398, and the at least one processor 1430 may correspond to the one or more processors 332, 384, or 394 and/or sidelink component 342, 388, or 398.

In an aspect, the memory 1410 and the at least one processor 1430 may be configured to: transmit, to a first UE, a capability enquiry message for a sidelink positioning procedure, the capability enquiry message including at least a request for an indication of whether the first UE has the capability to provide a location of the first UE for the sidelink positioning procedure; and receive, from the first UE, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

Figure 15:
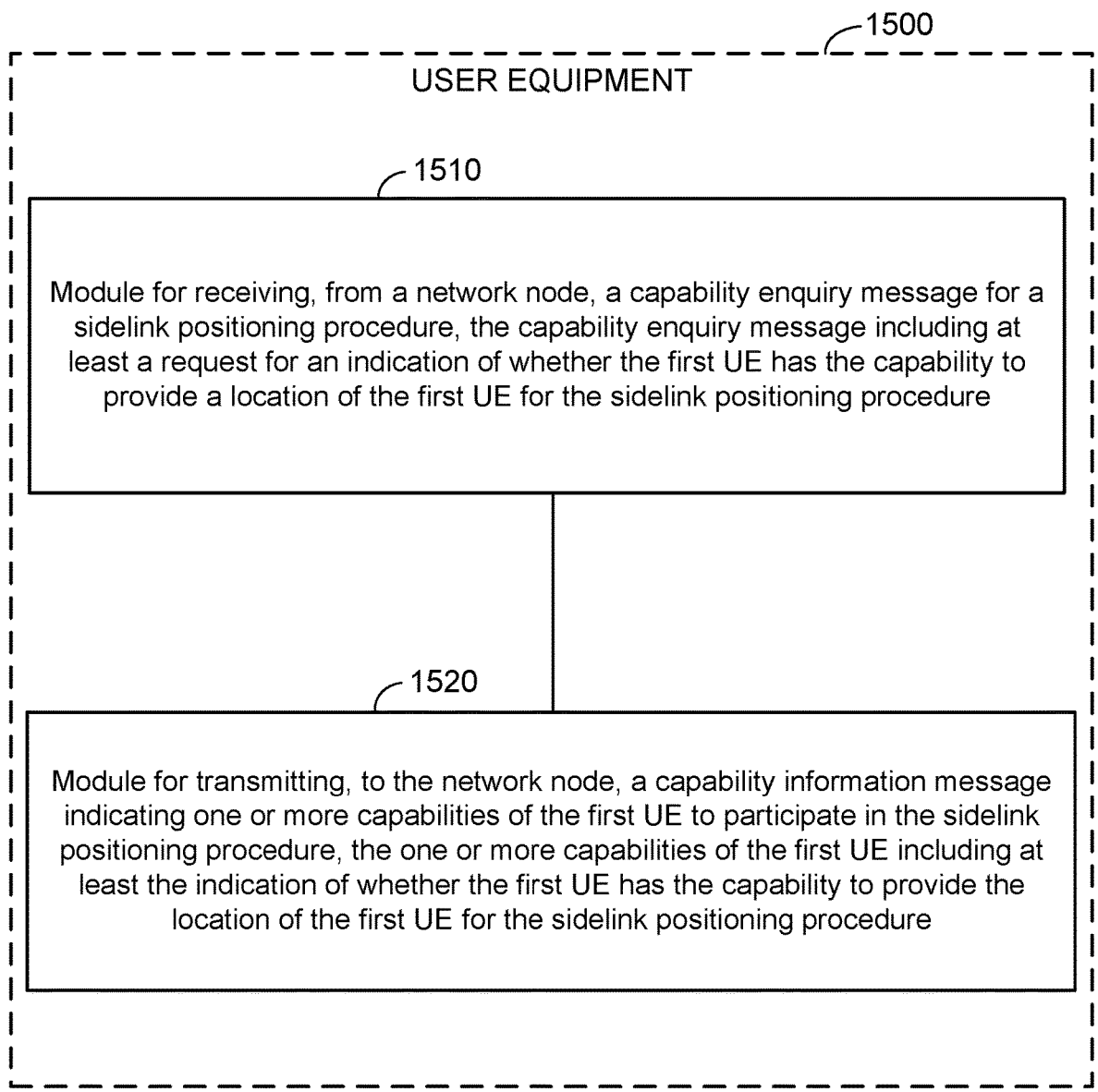

FIG. 15 illustrates an example user equipment 1500 represented as a series of interrelated functional modules. The user equipment 1500 may include a module for receiving 1510 and a module for transmitting 1520. In an aspect, the module for receiving 1510 may correspond to the one or more WWAN transceivers 310, the one or more processors 332, memory 340, and/or sidelink component 342, and the module for transmitting 1520 may correspond to the one or more WWAN transceivers 310, the one or more processors 332, memory 340, and/or sidelink component 342.

Figure 16:
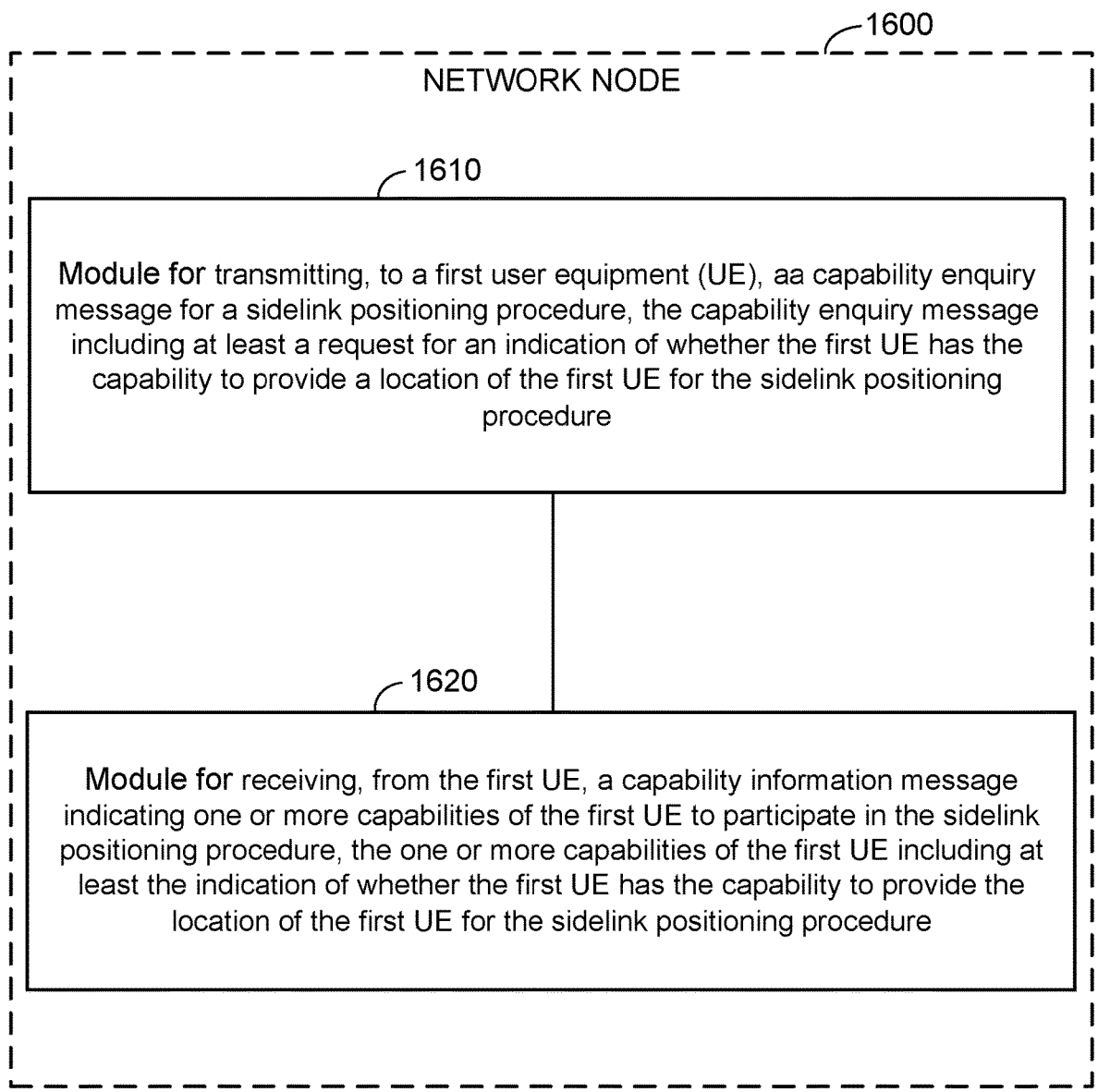

FIG. 16 illustrates an example network node 1600 represented as a series of interrelated functional modules. The network node 1600 may include a module for transmitting 1610 and a module for receiving 1620. In an aspect, depending on whether the network node 1600 is a UE, a base station, or a location server, the module for transmitting 1610 may correspond to the one or more transceivers 310, 350, or 390, the one or more processors 332, 384, or 394, memory 340, 386, or 396, and/or sidelink component 342, 388, or 398, and the module for receiving 1620 may correspond to the one or more transceivers 310, 350, or 390, the one or more processors 332, 384, or 394, memory 340, 386, or 396, and/or sidelink component 342, 388, or 398.

The functionality of the modules of FIGS. 15 and 16 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 15 and 16, as well as other components and functions described herein, may be implemented using any suitable means. Such means also may be implemented, at least in part, using corresponding structure as taught herein. For example, the components described above in conjunction with the "module for" components of FIGS. 15 and 16 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a first user equipment (UE), comprising: receiving, from a network node, a capability enquiry message for a sidelink positioning procedure, the capability enquiry message including at least a request for an indication of whether the first UE has the capability to provide a location of the first UE for the sidelink positioning procedure; and transmitting, to the network node, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

Clause 2. The method of clause 1, wherein: the capability enquiry message is a first radio resource control (RRC) message, a first medium access control control element (MAC-CE), first sidelink control information (SCI), or a first Long-Term Evolution (LTE) positioning protocol (LPP) message, and the capability information message is a second RRC message, a second MAC-CE, second SCI, or a second LPP message.

Clause 3. The method of any of clauses 1 to 2, wherein the indication of whether the first UE has the capability to provide the location of the first UE for the sidelink positioning procedure is a Boolean value.

Clause 4. The method of any of clauses 1 to 3, wherein the one or more capabilities of the first UE include an indication of whether the first UE has the capability to provide position calculation for the sidelink positioning procedure based on received location measurement information.

Clause 5. The method of clause 4, further comprising: determining a location of a second UE based, at least in part, on a location of the first UE and measurements of positioning reference signals received from the second UE.

Clause 6. The method of any of clauses 4 to 5, wherein the indication of whether the first UE has the capability to provide position calculation for the sidelink positioning procedure is a Boolean value.

Clause 7. The method of any of clauses 1 to 6, further comprising: receiving, from the network node, based on the indication of whether the first UE has the capability to provide the location of the first UE for the sidelink positioning procedure indicating that the first UE has the capability to provide the location of the first UE for the sidelink positioning procedure, a request for a location of the first UE; and transmitting, to the network node, the location of the first UE.

Clause 8. The method of any of clauses 1 to 7, wherein the one or more capabilities of the first UE include location coordinates of the first UE.

Clause 9. The method of any of clauses 1 to 8, wherein the network node is a third UE.

Clause 10. The method of clause 9, wherein: the capability enquiry message comprises a "UECapabilityEnquirySidelink" information element (IE), and the capability information message comprises a "UECapabilityInformationSidelink" IE.

Clause 11. The method of clause 10, wherein the indication of whether the first UE has the capability to provide the location of the first UE for the sidelink positioning procedure comprises a "PositionAnchorCapability Status" field in the "UECapabilityEnquirySidelink" IE, the "UECapabilityInformationSidelink" IE, or both.

Clause 12. The method of any of clauses 1 to 8, wherein the network node is a base station or a location server serving the first UE.

Clause 13. The method of clause 12, wherein: the capability enquiry message comprises a "UECapabilityEnquiry" IE, and the capability information message comprises a "UECapabilityInformation" IE.

Clause 14. The method of clause 13, wherein the indication of whether the first UE has the capability to provide the location of the first UE for the sidelink positioning procedure comprises a "PositionAnchorCapabilityStatus" field in the "UECapabilityEnquiry" IE, the "UECapabilityInformation" IE, or both.

Clause 15. A method of wireless communication performed by a network node, comprising: transmitting, to a first user equipment (UE), a capability enquiry message for a sidelink positioning procedure, the capability enquiry message including at least a request for an indication of whether the first UE has the capability to provide a location of the first UE for the sidelink positioning procedure; and receiving, from the first UE, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

Clause 16. The method of clause 15, further comprising: transmitting, to the first UE, based on the indication of whether the first UE has the capability to provide the location of the first UE for the sidelink positioning procedure indicating that the first UE has the capability to provide the location of the first UE for the sidelink positioning procedure, a request for a location of the first UE; and receiving, from the first UE, the location of the first UE.

Clause 17. The method of any of clauses 15 to 16, wherein the one or more capabilities of the first UE include location coordinates of the first UE.

Clause 18. The method of any of clauses 15 to 17, further comprising: determining a location of a second UE based, at least in part, on a location of the first UE and measurements of positioning reference signals received from the second UE.

Clause 19. The method of clause 18, wherein the network node is the second UE. Clause 20. The method of any of clauses 15 to 19, wherein: the capability enquiry message is a first radio resource control (RRC) message, a first medium access control control element (MAC-CE), first sidelink control information (SCI), or a first Long-Term Evolution (LTE) positioning protocol (LPP) message, and the capability information message is a second RRC message, a second MAC-CE, second SCI, or a second LPP message.

Clause 21. The method of any of clauses 15 to 20, wherein the one or more capabilities of the first UE include an indication of whether the first UE has the capability to provide position calculation for the sidelink positioning procedure based on received location measurement information.

Clause 22. The method of any of clauses 15 to 18, 20, and 21, wherein the network node is a base station or a location server serving the first UE.

Clause 23. A first user equipment (UE), comprising: a memory; and at least one processor communicatively coupled to the memory, the memory and the at least one processor configured to: receive, from a network node, a capability enquiry message for a sidelink positioning procedure, the capability enquiry message including at least a request for an indication of whether the first UE has the capability to provide a location of the first UE for the sidelink positioning procedure; and transmit, to the network node, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

Clause 24. The UE of clause 23, wherein: the capability enquiry message is a first radio resource control (RRC) message, a first medium access control control element (MAC-CE), first sidelink control information (SCI), or a first Long-Term Evolution (LTE) positioning protocol (LPP) message, and the capability information message is a second RRC message, a second MAC-CE, second SCI, or a second LPP message.

Clause 25. The UE of any of clauses 23 to 24, wherein the indication of whether the first UE has the capability to provide the location of the first UE for the sidelink positioning procedure is a Boolean value.

Clause 26. The UE of any of clauses 23 to 25, wherein the one or more capabilities of the first UE include an indication of whether the first UE has the capability to provide position calculation for the sidelink positioning procedure based on received location measurement information.

Clause 27. The UE of clause 26, wherein the memory and the at least one processor are further configured to: determine a location of a second UE based, at least in part, on a location of the first UE and measurements of positioning reference signals received from the second UE.

Clause 28. The UE of any of clauses 26 to 27, wherein the indication of whether the first UE has the capability to provide position calculation for the sidelink positioning procedure is a Boolean value.

Clause 29. The UE of any of clauses 23 to 28, wherein the memory and the at least one processor are further configured to: receive, from the network node, based on the indication of whether the first UE has the capability to provide the location of the first UE for the sidelink positioning procedure indicating that the first UE has the capability to provide the location of the first UE for the sidelink positioning procedure, a request for a location of the first UE; and transmit, to the network node, the location of the first UE.

Clause 30. The UE of any of clauses 23 to 29, wherein the one or more capabilities of the first UE include location coordinates of the first UE.

Clause 31. The UE of any of clauses 23 to 30, wherein the network node is a third UE. Clause 32. The UE of clause 31, wherein: the capability enquiry message comprises a "UECapabilityEnquirySidelink" information element (IE), and the capability information message comprises a "UECapabilityInformationSidelink" IE.

Clause 33. The UE of clause 32, wherein the indication of whether the first UE has the capability to provide the location of the first UE for the sidelink positioning procedure comprises a "PositionAnchorCapability Status" field in the "UECapabilityEnquirySidelink" IE, the "UECapabilityInformationSidelink" IE, or both.

Clause 34. The UE of any of clauses 23 to 30, wherein the network node is a base station or a location server serving the first UE.

Clause 35. The UE of clause 34, wherein: the capability enquiry message comprises a "UECapabilityEnquiry" IE, and the capability information message comprises a "UECapabilityInformation" IE.

Clause 36. The UE of clause 35, wherein the indication of whether the first UE has the capability to provide the location of the first UE for the sidelink positioning procedure comprises a "PositionAnchorCapabilityStatus" field in the "UECapabilityEnquiry" IE, the "UECapabilityInformation" IE, or both.

Clause 37. A network node, comprising: a memory; and at least one processor communicatively coupled to the memory, the memory and the at least one processor configured to: transmit, to a first user equipment (UE), a capability enquiry message for a sidelink positioning procedure, the capability enquiry message including at least a request for an indication of whether the first UE has the capability to provide a location of the first UE for the sidelink positioning procedure; and receive, from the first UE, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

Clause 38. The network node of clause 37, wherein the memory and the at least one processor are further configured to: transmit, to the first UE, based on the indication of whether the first UE has the capability to provide the location of the first UE for the sidelink positioning procedure indicating that the first UE has the capability to provide the location of the first UE for the sidelink positioning procedure, a request for a location of the first UE; and receive, from the first UE, the location of the first UE.

Clause 39. The network node of any of clauses 37 to 38, wherein the one or more capabilities of the first UE include location coordinates of the first UE.

Clause 40. The network node of any of clauses 37 to 39, wherein the memory and the at least one processor are further configured to: determine a location of a second UE based, at least in part, on a location of the first UE and measurements of positioning reference signals received from the second UE.

Clause 41. The network node of clause 40, wherein the network node is the second UE.

Clause 42. The network node of any of clauses 37 to 41, wherein: the capability enquiry message is a first radio resource control (RRC) message, a first medium access control control element (MAC-CE), first sidelink control information (SCI), or a first Long-Term Evolution (LTE) positioning protocol (LPP) message, and the capability information message is a second RRC message, a second MAC-CE, second SCI, or a second LPP message.

Clause 43. The network node of any of clauses 37 to 42, wherein the one or more capabilities of the first UE include an indication of whether the first UE has the capability to provide position calculation for the sidelink positioning procedure based on received location measurement information.

Clause 44. The network node of any of clauses 37 to 40, 42, and 43, wherein the network node is a base station or a location server serving the first UE.

Clause 45. A first user equipment (UE), comprising: means for receiving, from a network node, a capability enquiry message for a sidelink positioning procedure, the capability enquiry message including at least a request for an indication of whether the first UE has the capability to provide a location of the first UE for the sidelink positioning procedure; and means for transmitting, to the network node, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

Clause 46. The UE of clause 45, wherein: the capability enquiry message is a first radio resource control (RRC) message, a first medium access control control element (MAC-CE), first sidelink control information (SCI), or a first Long-Term Evolution (LTE) positioning protocol (LPP) message, and the capability information message is a second RRC message, a second MAC-CE, second SCI, or a second LPP message.

Clause 47. The UE of any of clauses 45 to 46, wherein the indication of whether the first UE has the capability to provide the location of the first UE for the sidelink positioning procedure is a Boolean value.

Clause 48. The UE of any of clauses 45 to 47, wherein the one or more capabilities of the first UE include an indication of whether the first UE has the capability to provide position calculation for the sidelink positioning procedure based on received location measurement information.

Clause 49. The UE of clause 48, further comprising: means for determining a location of a second UE based, at least in part, on a location of the first UE and measurements of positioning reference signals received from the second UE.

Clause 50. The UE of any of clauses 48 to 49, wherein the indication of whether the first UE has the capability to provide position calculation for the sidelink positioning procedure is a Boolean value.

Clause 51. The UE of any of clauses 45 to 50, further comprising: means for receiving, from the network node, based on the indication of whether the first UE has the capability to provide the location of the first UE for the sidelink positioning procedure indicating that the first UE has the capability to provide the location of the first UE for the sidelink positioning procedure, a request for a location of the first UE; and means for transmitting, to the network node, the location of the first UE.

Clause 52. The UE of any of clauses 45 to 51, wherein the one or more capabilities of the first UE include location coordinates of the first UE.

Clause 53. The UE of any of clauses 45 to 52, wherein the network node is a third UE. Clause 54. The UE of clause 53, wherein: the capability enquiry message comprises a "UECapabilityEnquirySidelink" information element (IE), and the capability information message comprises a "UECapabilityInformationSidelink" IE.

Clause 55. The UE of clause 54, wherein the indication of whether the first UE has the capability to provide the location of the first UE for the sidelink positioning procedure comprises a "PositionAnchorCapability Status" field in the "UECapabilityEnquirySidelink" IE, the "UECapabilityInformationSidelink" IE, or both.

Clause 56. The UE of any of clauses 45 to 52, wherein the network node is a base station or a location server serving the first UE.

Clause 57. The UE of clause 56, wherein: the capability enquiry message comprises a "UECapabilityEnquiry" IE, and the capability information message comprises a "UECapabilityInformation" IE.

Clause 58. The UE of clause 57, wherein the indication of whether the first UE has the capability to provide the location of the first UE for the sidelink positioning procedure comprises a "PositionAnchorCapabilityStatus" field in the "UECapabilityEnquiry" IE, the "UECapabilityInformation" IE, or both.

Clause 59. A network node, comprising: means for transmitting, to a first user equipment (UE), a capability enquiry message for a sidelink positioning procedure, the capability enquiry message including at least a request for an indication of whether the first UE has the capability to provide a location of the first UE for the sidelink positioning procedure; and means for receiving, from the first UE, a capability information message indicating one or more capabilities of the first UE to participate in the sidelink positioning procedure, the one or more capabilities of the first UE including at least the indication of whether the first UE has the capability to provide the location of the first UE for the sidelink positioning procedure.

Clause 60. The network node of clause 59, further comprising: means for transmitting, to the first UE, based on the indication of whether the first UE has the capability to provide the location of the first UE for the sidelink positioning procedure indicating that the first UE has the capability to provide the location of the first UE for the sidelink positioning procedure, a request for a location of the first UE; and means for receiving, from the first UE, the location of the first UE.

Clause 61. The network node of any of clauses 59 to 60, wherein the one or more capabilities of the first UE include location coordinates of the first UE.

Clause 62. The network node of any of clauses 59 to 61, further comprising: means for determining a location of a second UE based, at least in part, on a location of the first UE and measurements of positioning reference signals received from the second UE.

Clause 63. The network node of clause 62, wherein the network node is the second UE.

Clause 64. The network node of any of clauses 59 to 63, wherein: the capability enquiry message is a first radio resource control (RRC) message, a first medium access control control element (MAC-CE), first sidelink control information (SCI), or a first Long-Term Evolution (LTE) positioning protocol (LPP) message, and the capability information message is a second RRC message, a second MAC-CE, second SCI, or a second LPP message.

Clause 65. The network node of any of clauses 59 to 64, wherein the one or more capabilities of the first UE include an indication of whether the first UE has the capability to provide position calculation for the sidelink positioning procedure based on received location measurement information.

Clause 66. The network node of any of clauses 59 to 62, 64, and 65, wherein the network node is a base station or a location server serving the first UE.

Clause 67. A non-transitory computer-readable medium storing computer-executable instructions, the computer-executable comprising at least one instruction for causing a computer or processor to perform a method according to any of clauses 1 to 66.

What is claimed is:
1. A method of wireless communication performed by a first user equipment (UE), comprising:
receiving, from a second UE, a first message for a sidelink positioning procedure; and
transmitting, to the second UE, a second message indicating one or more capabilities of the first UE to participate in the sidelink positioning procedure, the one or more capabilities of the first UE including at least an indication that the first UE is capable of being an anchor UE for the sidelink positioning procedure.

2. The method of claim 1, wherein the indication that the first UE is capable of being the anchor UE for the sidelink positioning procedure indicates that the first UE is capable of providing a location of the first UE for the sidelink positioning procedure.

3. The method of claim 2, wherein the first message includes at least a request for the indication of whether the first UE is capable of providing the location of the first UE for the sidelink positioning procedure.

4. The method of claim 1, wherein the one or more capabilities of the first UE include an indication that the first UE is capable of providing position calculation for the sidelink positioning procedure based on received location measurement information.

5. The method of claim 1, further comprising:
receiving, from the second UE, a second message requesting a location of the first UE; and
transmitting, to the second UE, the location of the first UE.

6. The method of claim 1, wherein the one or more capabilities of the first UE include location coordinates of the first UE.

7. A method of wireless communication performed by a second user equipment (UE), comprising:
transmitting, to a first UE, a first message for a sidelink positioning procedure; and
receiving, from the first UE, a second message indicating one or more capabilities of the first UE to participate in the sidelink positioning procedure, the one or more capabilities of the first UE including at least an indication that the first UE is capable of being an anchor UE for the sidelink positioning procedure.

8. The method of claim 7, wherein the indication that the first UE is capable of being the anchor UE for the sidelink positioning procedure indicates that the first UE is capable of providing a location of the first UE for the sidelink positioning procedure.

9. The method of claim 8, wherein the first message includes at least a request for the indication of whether the first UE is capable of providing the location of the first UE for the sidelink positioning procedure.

10. The method of claim 7, wherein the one or more capabilities of the first UE include an indication that the first UE is capable of providing position calculation for the sidelink positioning procedure based on received location measurement information.

11. The method of claim 7, further comprising:
transmitting, to the first UE, a second message requesting a location of the first UE; and
receiving, from the first UE, the location of the first UE.

12. The method of claim 7, wherein the one or more capabilities of the first UE include location coordinates of the first UE.

13. A first user equipment (UE), comprising:
one or more memories;
one or more transceivers; and
one or more processors communicatively coupled to the one or more memories and the one or more transceivers, the one or more processors, either alone or in combination, configured to:
receive, via the one or more transceivers, from a second UE, a first message for a sidelink positioning procedure; and
transmit, via the one or more transceivers, to the second UE, a second message indicating one or more capabilities of the first UE to participate in the sidelink positioning procedure, the one or more capabilities of the first UE including at least an indication that the first UE is capable of being an anchor UE for the sidelink positioning procedure.

14. The UE of claim 13, wherein the indication that the first UE is capable of being the anchor UE for the sidelink positioning procedure indicates that the first UE is capable of providing a location of the first UE for the sidelink positioning procedure.

15. The UE of claim 14, wherein the first message includes at least a request for the indication of whether the first UE is capable of providing the location of the first UE for the sidelink positioning procedure.

16. The UE of claim 13, wherein the one or more capabilities of the first UE include an indication that the first UE is capable of providing position calculation for the sidelink positioning procedure based on received location measurement information.

17. The UE of claim 13, wherein the one or more processors, either alone or in combination, are further configured to:
receive, via the one or more transceivers, from the second UE, a second message requesting a location of the first UE; and
transmit, via the one or more transceivers, to the second UE, the location of the first UE.

18. The UE of claim 13, wherein the one or more capabilities of the first UE include location coordinates of the first UE.

19. A second user equipment (UE), comprising:
one or more memories;
one or more transceivers; and
one or more processors communicatively coupled to the one or more memories and the one or more transceivers, the one or more processors, either alone or in combination, configured to:
transmit, via the one or more transceivers, to a first UE, a first message for a sidelink positioning procedure; and
receive, via the one or more transceivers, from the first UE, a second message indicating one or more capabilities of the first UE to participate in the sidelink positioning procedure, the one or more capabilities of the first UE including at least an indication that the first UE is capable of being an anchor UE for the sidelink positioning procedure.

20. The UE of claim 19, wherein the indication that the first UE is capable of being the anchor UE for the sidelink positioning procedure indicates that the first UE is capable of providing a location of the first UE for the sidelink positioning procedure.

21. The UE of claim 20, wherein the first message includes at least a request for the indication of whether the first UE is capable of providing the location of the first UE for the sidelink positioning procedure.

22. The UE of claim 19, wherein the one or more capabilities of the first UE include an indication that the first UE is capable of providing position calculation for the sidelink positioning procedure based on received location measurement information.

23. The UE of claim 19, wherein the one or more processors, either alone or in combination, are further configured to:
transmit, via the one or more transceivers, to the first UE, a second message requesting a location of the first UE; and
receive, via the one or more transceivers, from the first UE, the location of the first UE.

24. The UE of claim 19, wherein the one or more capabilities of the first UE include location coordinates of the first UE.

* * * * *